(12) United States Patent
Lee et al.

(10) Patent No.: US 12,389,369 B2
(45) Date of Patent: Aug. 12, 2025

(54) METHOD FOR TRANSMITTING AND RECEIVING SIGNAL IN WIRELESS COMMUNICATION SYSTEM, AND APPARATUS SUPPORTING SAME

(71) Applicant: LG ELECTRONICS INC., Seoul (KR)

(72) Inventors: Jeongsu Lee, Seoul (KR); Hyunsu Cha, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 18/011,474

(22) PCT Filed: Jul. 2, 2021

(86) PCT No.: PCT/KR2021/008439
§ 371 (c)(1),
(2) Date: Dec. 19, 2022

(87) PCT Pub. No.: WO2022/005254
PCT Pub. Date: Jan. 6, 2022

(65) Prior Publication Data
US 2023/0292285 A1    Sep. 14, 2023

(30) Foreign Application Priority Data

Jul. 2, 2020    (KR) .......................... 10-2020-0081689

(51) Int. Cl.
*H04W 4/00* (2018.01)
*H04W 4/90* (2018.01)
(Continued)

(52) U.S. Cl.
CPC ............. *H04W 68/02* (2013.01); *H04W 4/90* (2018.02); *H04W 64/00* (2013.01)

(58) Field of Classification Search
CPC ....... H04W 68/02; H04W 4/90; H04W 64/00; H04W 4/02; H04W 68/025; H04W 24/08; H04W 68/005
See application file for complete search history.

(56) References Cited

U.S. PATENT DOCUMENTS 11,229,041 B2 *   1/2022  Yu ..................... H04W 72/1273
2019/0239187 A1 * 8/2019  Islam .................... H04L 5/0048
2019/0313365 A1  10/2019  Islam et al.

FOREIGN PATENT DOCUMENTS

WO    2020069144    4/2020

OTHER PUBLICATIONS

Korean Intellectual Property Office Application No. 10-2022-7040667, Notice of Allowance dated Feb. 14, 2025, 6 pages.

(Continued)

*Primary Examiner* — Omoniyi Obayanju
(74) *Attorney, Agent, or Firm* — LEE, HONG, DEGERMAN, KANG & WAIMEY

(57) ABSTRACT

Various embodiments relate to a next generation wireless communication system for supporting a higher data transmission rate or the like than a 4th generation (4G) wireless communication system. According to various embodiments, a method for transmitting and receiving a signal in a wireless communication system and an apparatus supporting same may be provided, and various other embodiments may be provided.

12 Claims, 25 Drawing Sheets

(51) Int. Cl.
*H04W 64/00* (2009.01)
*H04W 68/02* (2009.01)

(56) References Cited

OTHER PUBLICATIONS

3rd Generation Partnership Project; Technical Specification Group Radio Access Network; NR; Radio Resource Control (RRC) protocol specification (Release), 3GPP TS 38.331 V16.0.0, Mar. 2020, 843 pages.

* cited by examiner

FIG. 6
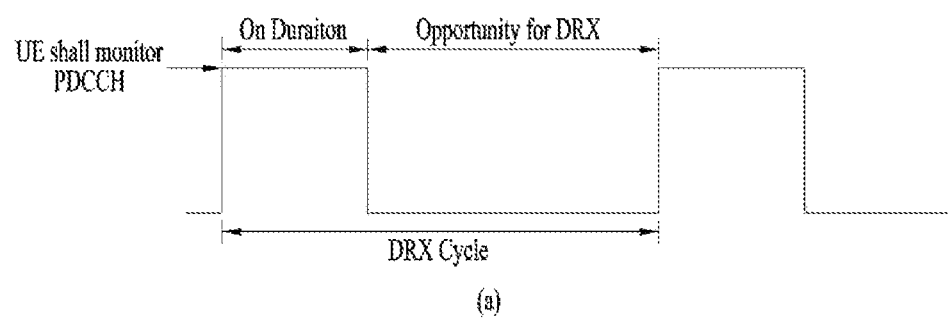
(a)
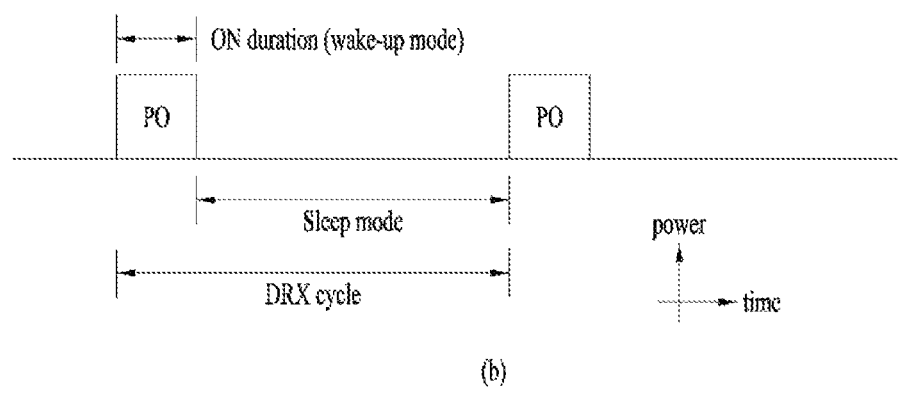
(b)

FIG. 14
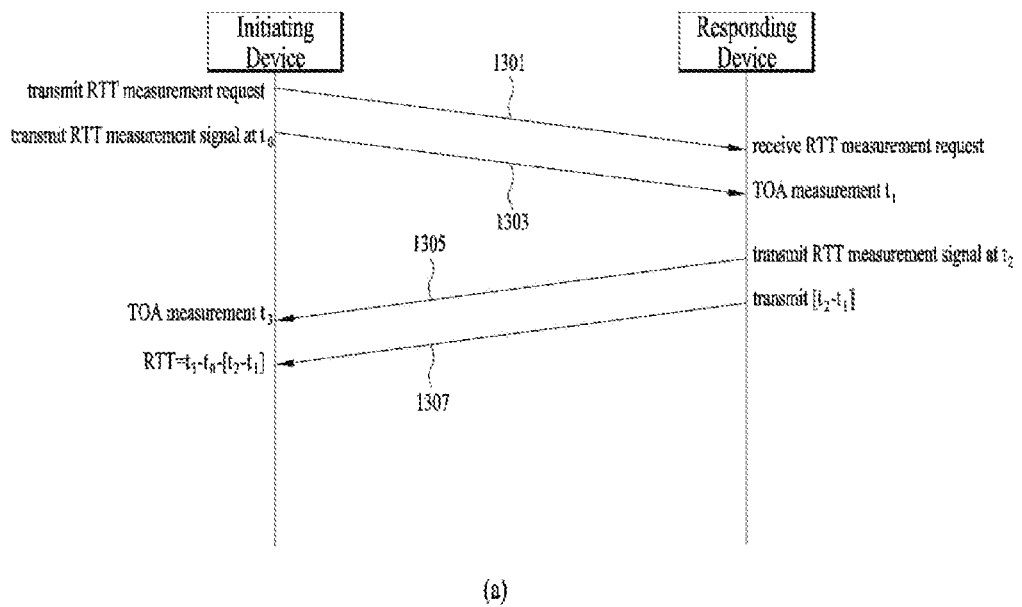
(a)
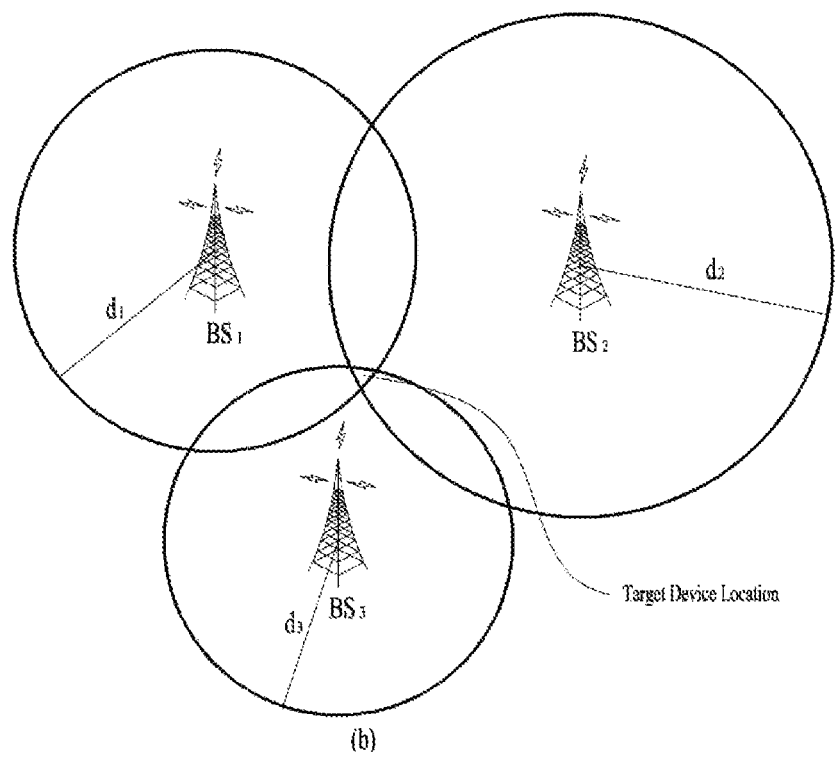
(b)

METHOD FOR TRANSMITTING AND RECEIVING SIGNAL IN WIRELESS COMMUNICATION SYSTEM, AND APPARATUS SUPPORTING SAME

CROSS-REFERENCE TO RELATED APPLICATION(S)

This application is the National Stage filing under 35 U.S.C. 371 of International Application No. PCT/KR2021/008439, filed on Jul. 2, 2021, which claims the benefit of earlier filing date and right of priority to Korean Application No. 10-2020-0081689, filed on Jul. 2, 2020, the contents of which are all incorporated by reference herein in their entirety.

TECHNICAL FIELD

Various embodiments are related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

Various embodiments may provide a method and apparatus for transmitting and receiving a signal in a wireless communication system.

Various embodiments may provide a positioning method based on timing measurement and an apparatus supporting the same.

Various embodiments may provide a method of indicating a modification in positioning system information to a user equipment (UE) in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Various embodiments may provide a method and apparatus for transmitting and receiving a signal in a wireless communication system.

According to various embodiments, a method performed by a user equipment (UE) in a wireless communication system may be provided.

According to various embodiments, the method may include: receiving downlink control information (DCI) with a cyclic redundancy check (CRC) scrambled with a radio network temporary identifier (RNTI) related to paging; and obtaining a message including a plurality of bits based on the DCI.

According to various embodiments, a most significant bit (MSB) of the plurality of bits may be related to an indication of a modification in system information other than positioning system information.

According to various embodiments, at least one bit except for the MSB among the plurality of bits may be related to an indication of a modification of the positioning system information.

According to various embodiments, the at least one bit with a first value may be mapped to an indication that the positioning system information is modified, and According to various embodiments, the at least one bit with a second value may be mapped to an indication that the positioning system information is not modified.

According to various embodiments, the plurality of bits may be 8 bits, and the at least one bit may be a 4th MSB of the 8 bits.

According to various embodiments, a second MSB of the 8 bits may be related to an indication of at least one of an earthquake and tsunami warning system (ETWS) or a commercial mobile alert system (CMAS).

According to various embodiments, a third MSB of the 8 bits may be related to an indication of termination of monitoring of a physical downlink control channel (PDCCH) for the paging.

According to various embodiments, remaining 4 bits except for the MSB, the second MSB, the third MSB, and the 4th MSB among the 8 bits may be ignored.

According to various embodiments, a scheduled physical downlink shared channel (PDSCH) may be received based on the DCI.

According to various embodiments, based on identifying that the positioning system information is modified based on the at least one bit, the PDSCH may include: (i) UE identity information and (ii) information related to at least one modified positioning system information type among a plurality of predefined positioning system information types.

According to various embodiments, based on the UE identity information matching an identifier assigned to the UE, the information related to the at least one modified positioning system information type may be obtained.

According to various embodiments, a user equipment (UE) configured to operate in a wireless communication system may be provided.

According to various embodiments, the UE may include: a transceiver; and at least one processor coupled with the transceiver.

According to various embodiments, the at least one processor may be configured to: receive DCI with a CRC scrambled with an RNTI related to paging; and obtain a message including a plurality of bits based on the DCI.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

According to various embodiments, the at least one bit with a first value may be mapped to an indication that the positioning system information is modified.

According to various embodiments, the at least one bit with a second value may be mapped to an indication that the positioning system information is not modified.

According to various embodiments, the plurality of bits may be 8 bits, and the at least one bit may be a 4th MSB of the 8 bits.

According to various embodiments, a second MSB of the 8 bits may be related to an indication of at least one of an ETWS or a CMAS.

According to various embodiments, a third MSB of the 8 bits may be related to an indication of termination of monitoring of a PDCCH for the paging.

According to various embodiments, remaining 4 bits except for the MSB, the second MSB, the third MSB, and the 4th MSB among the 8 bits may be ignored.

According to various embodiments, a scheduled PDSCH may be received based on the DCI.

According to various embodiments, based on identifying that the positioning system information is modified based on the at least one bit, the PDSCH may include: (i) UE identity information and (ii) information related to at least one modified positioning system information type among a plurality of predefined positioning system information types.

According to various embodiments, based on the UE identity information matching an identifier assigned to the UE, the information related to the at least one modified positioning system information type may be obtained.

According to various embodiments, the at least one processor may be configured to communicate with at least one of a mobile UE, a network, and an autonomous vehicle other than a vehicle in which the UE is included.

According to various embodiments, a method performed by a base station in a wireless communication system may be provided.

According to various embodiments, the method may include: obtaining DCI with a CRC scrambled with an RNTI related to paging; and transmitting the DCI, According to various embodiments, the DCI may include a message including a plurality of bits.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

According to various embodiments, a base station configured to operate in a wireless communication system may be provided.

According to various embodiments, the base station may include: a transceiver; and at least one processor coupled with the transceiver.

According to various embodiments, the at least one processor may be configured to: obtain DCI with a CRC scrambled with an RNTI related to paging; and transmit the DCI.

According to various embodiments, the DCI may include a message including a plurality of bits.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

According to various embodiments, an apparatus configured to operate in a wireless communication system may be provided.

According to various embodiments, the apparatus may include: at least one processor; and at least one memory storing at least one instruction to cause the at least one processor to perform operations.

According to various embodiments, the operations may include: receiving DCI with a CRC scrambled with an RNTI related to paging; and obtaining a message including a plurality of bits based on the DCI.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

According to various embodiments, a non-transitory processor-readable medium configured to store one or more instructions that cause at least one processor to perform operations may be provided.

According to various embodiments, the operations may include: receiving DCI with a CRC scrambled with an RNTI related to paging; and obtaining a message including a plurality of bits based on the DCI.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

According to various embodiments, a signal may be effectively transmitted and received in a wireless communication system.

According to various embodiments, positioning may be effectively performed in a wireless communication system.

According to various embodiments, the complexity and latency of a user equipment (UE) may be reduced.

According to various embodiments, the power consumption of a UE may be reduced.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 6 is a diagram illustrating exemplary paging to which various embodiments are applicable.

FIG. 14 is a diagram illustrating a multi-round trip time (multi-RTT) positioning method to which various embodiments are applicable.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
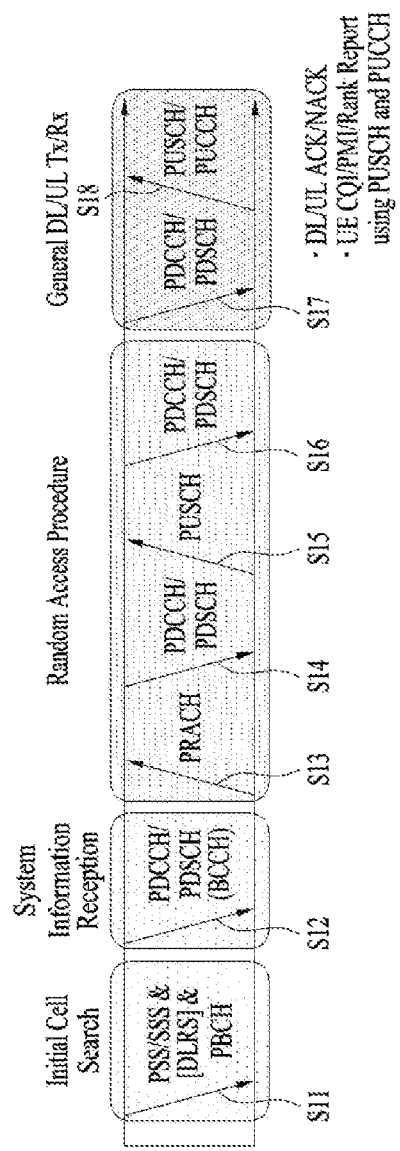
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in the NR system, the time-domain sizes of various fields are represented as multiples of a basic time unit for NR, Tc=1/($\Delta$fmax*Nf) where $\Delta$fmax=480*10³ Hz and a value Nf related to a fast Fourier transform (FFT) size or an inverse fast Fourier transform (IFFT) size is given as Nf=4096. Tc and Ts which is an LTE-based time unit and sampling time, given as Ts=1/((15 kHz)*2048) are placed in the following relationship: Ts/Tc=64. DL and UL transmissions are organized into (radio) frames each having a duration of Tf=($\Delta$fmax*Nf/100)*Tc=10 ms. Each radio frame includes 10 subframes each having a duration of Tsf=($\Delta$fmax*Nf/1000)*Tc=1 ms. There may exist one set of frames for UL and one set of frames for DL. For a numerology slots are numbered with $n\mu s \in \{0, \ldots, Nslot,\mu subframe-1\}$ in an increasing order in a subframe, and with $n\mu s,f \in \{0, \ldots, Nslot,\mu frame-1\}$ in an increasing order in a radio frame. One slot includes N$\mu$symb consecutive OFDM symbols, and N$\mu$symb depends on a CP. The start of a slot n$\mu$s in a subframe is aligned in time with the start of an OFDM symbol n$\mu$s*N$\mu$symb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 2:
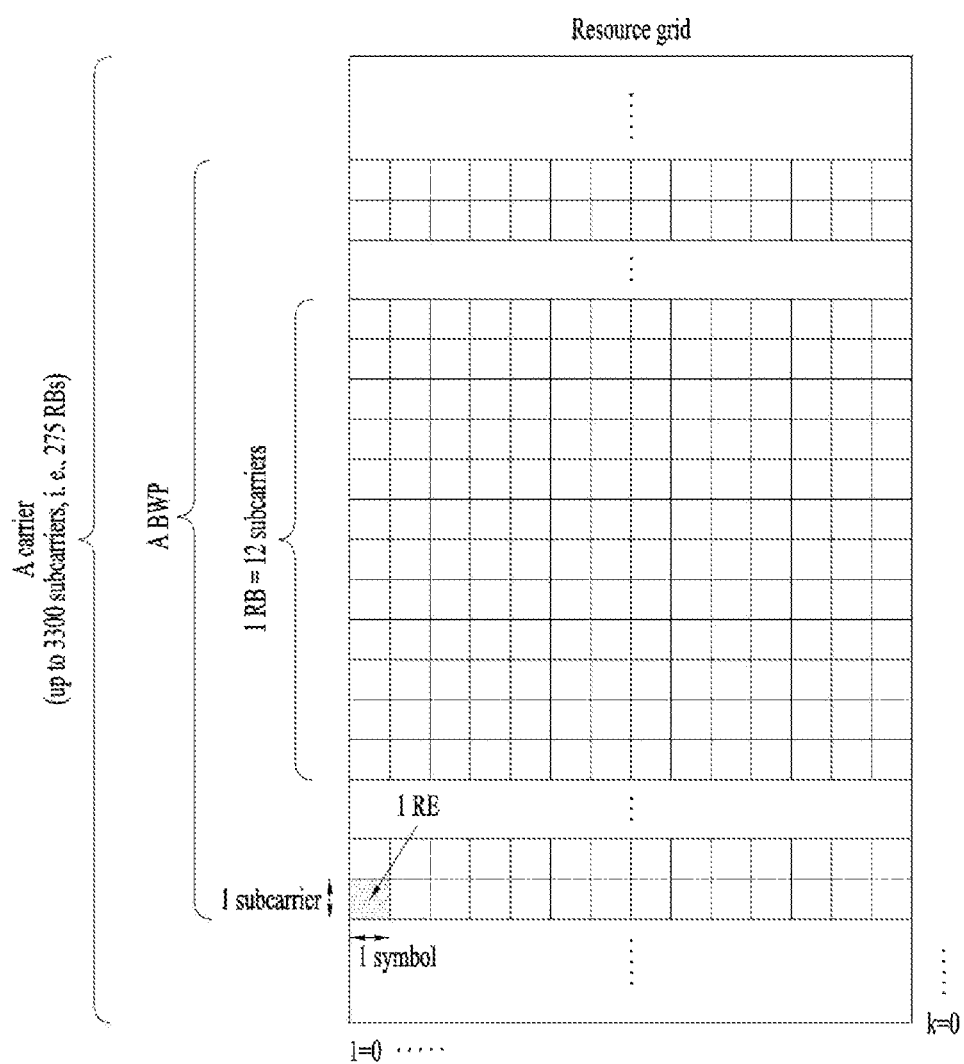
FIG. 2 illustrates an exemplary resource grid to which various embodiments are applicable.

FIG. 2 illustrates an exemplary resource grid to which various embodiments are applicable.

Referring to FIG. 2, for each subcarrier spacing (SCS) and carrier, a resource grid is defined as $14 \times 2^{\mu}$ OFDM symbols by $N_{grid}^{size, \mu} \times N_{SC}^{RB}$ subcarriers, where $N_{grid}^{size, \mu}$ is by RRC signaling from the BS. $N_{grid}^{size, \mu}$ may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 3:
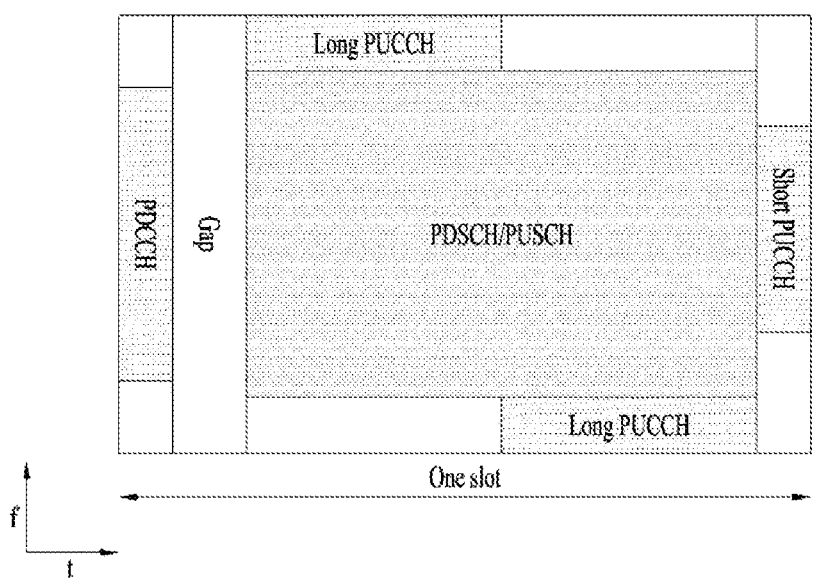
FIG. 3 is a diagram illustrating mapping of physical channels in a slot, to which various embodiments are applicable.

FIG. 3 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. RRC (Radio Resource Control) State

Figure 4:
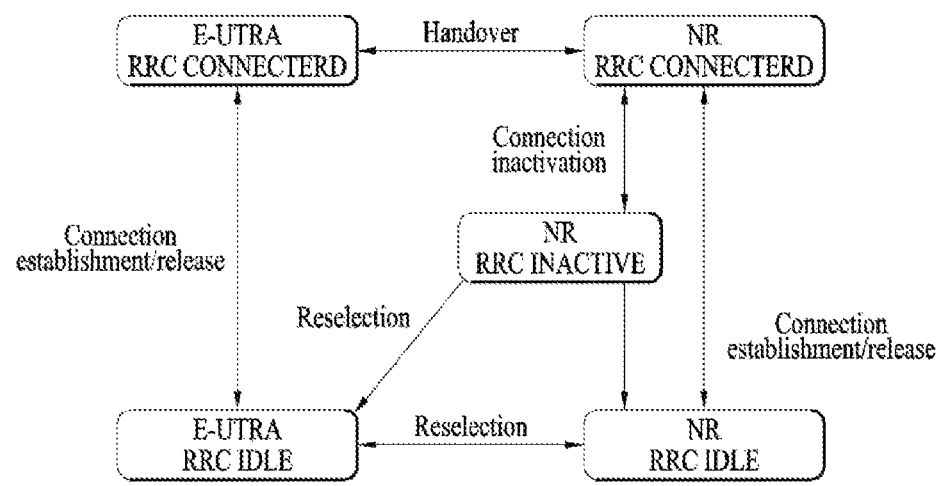
FIG. 4 is a diagram illustrating an RRC state of the UE, RRC state transition, and a mobility procedure supported between NR/NGC (NR/Next Generation Core) and E-UTRAN/EPC (Evolved-Universal Terrestrial Radio Access Network/Evolved Packet Core) according to various embodiments of the present disclosure.

FIG. 4 is a diagram illustrating an RRC state of the UE, RRC state transition, and a mobility procedure supported between NR/NGC (NR/Next Generation Core) and E-UTRAN/EPC (Evolved-Universal Terrestrial Radio Access Network/Evolved Packet Core) according to various embodiments of the present disclosure.

The UE has only one RRC state at a specific time. The RRC state may indicate whether the RRC layer of the UE was logically connected to an NG RAN (Radio Access Network) layer. When the RRC connection is established, the UE is in an RRC_CONNECTED or RRC_INACTIVE state. Alternatively, when the RRC connection is not established, the UE is in the RRC_idle state.

When the UE is in RRC_CONNECTED or RRC_INACTIVE state, the UE has RRC connection, so that the NG RAN may recognize the presence of the UE for each cell. On the other hand, when the UE is in RRC_IDLE state, the UE cannot be recognized by the NG RAN, and the UE is managed by a core network for each tracking area unit that is larger in size than the cell.

When an initial user powers on the UE, the UE may search for an appropriate cell, and may maintain the RRC_IDLE state in the corresponding cell. If only the RRC connection needs to be established, the UE in the RRC_IDLE state may establish RRC connection with the NG RAN through the RRC connection procedure, and may transition to the RRC_CONNECTED or RRC_INACTIVE state.

RRC states of the UE may have the following characteristics.

(1) RRC_IDLE State

Discontinuous reception (DRX) is established in the UE by higher layer signaling.

UE mobility is controlled based on network configuration.

UE monitors a paging channel.

UE performs neighbor cell measurement and cell (re) selection.

UE obtains system information.

(2) RRC_INACTIVE State

Discontinuous reception (DRX) is established in the UE by higher layer signaling or by RRC layer signaling.

UE mobility is controlled based on network configuration.

UE stores an Access Stratum (AS) context

UE monitors a paging channel.

UE performs neighbor cell measurement and cell (re) selection.

When the UE moves out of a RAN-based notification area, the UE updates the RAN-based notification area.

UE obtains system information.

(3) RRC_CONNECTED State

UE stores the AS context.

UE transmits and receives unicast data.

In a lower layer, a UE-specific DRX may be configured in the UE.

For increased bandwidth, a UE supporting carrier aggregation (CA) may use at least one SCell combined with a specific cell (SpCell).

For increased bandwidth, a UE supporting dual connectivity (DC) may use a secondary cell group (SCG) combined with a master cell group (MCG).

UE monitors a paging channel.

When data is scheduled for the UE, the UE monitors control channels related to a shared data channel.

UE provides channel quality and feedback information.

UE performs neighbor cell measurement and cell (re) selection.

UE obtains system information.

In particular, the UE in the RRC_IDLE state and the RRC_INACTIVE state may operate as shown in Table 5 below.

TABLE 5

| | UE procedure |
|---|---|
| 1st step | a public land mobile network (PLMN) selection when a UE is switched on |
| 2nd Step | cell (re)selection for searching a suitable cell |
| 3rd Step | tune to its control channel (camping on the cell) |
| 4th Step | Location registration and a RAN-based Notification Area (RNA) update |

1.4. SI Acquisition

Figure 5:
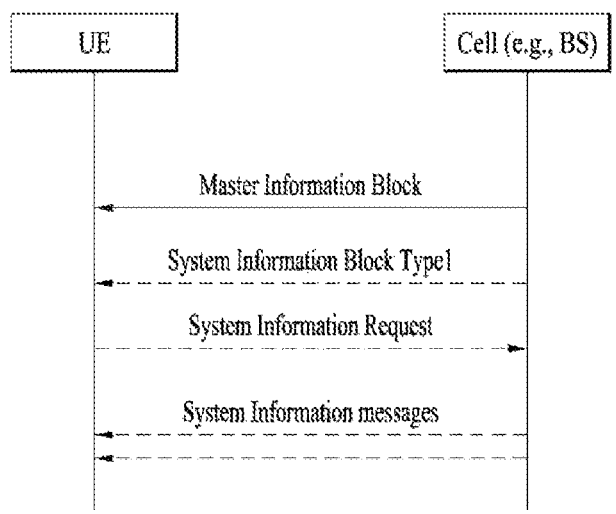
FIG. 5 illustrates a system information (SI) acquisition procedure which various embodiments of the present disclosure are applicable.

FIG. 5 illustrates a system information (SI) acquisition procedure which various embodiments of the present disclosure are applicable.

The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

The SI may be divided into a Master Information Block (MIB) and a plurality of System Information Blocks (SIBs). The SI other than the MIB may be referred to as Remaining Minimum System Information (RMSI), which will be described below in detail.

The MIB may include information/parameters related to reception of SystemInformationBlockType1 (SIB1) and may be transmitted through the PBCH of the SSB.

The MIB may include information/parameters related to reception of SystemInformationBlockType1 (SIB1) and may be transmitted through the PBCH of the SSB. Information of the MIB may be understood with reference to 3GPP TS 38.331 and may include the following fields.

| | |
|---|---|
| - subCarrierSpacingCommon | ENUMERATED {scs15or60, scs30or120}, |
| - ssb-SubcarrierOffset | INTEGER (0..15), |
| - pdcch-ConfigSIB1 | INTEGER (0..255), |
| - dmrs-TypeA-Position | ENUMERATED {pos2, pos3}, |
| ... | |
| - spare BIT STRING (SIZE (1)) | |

Descriptions of the fields are shown in Table 6 below.

TABLE 6 pdcch-ConfigSIB1
Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 of the frequency range where the network does not provide SS/PBCH block with SIB1 (see TS 38.213, clause 13).
ssb-SubcarrierOffset
Corresponds to $k_{SSB}$ (see TS 38.213), which is the frequency domain offset between SSB and the overall resource block grid in number of subcarriers, (See TS 38.211, clause 7.4.3.1).
The value range of this field may be extended by an additional most significant bit encoded within PBCH as specified in TS 38 213.
This field may indicate that this cell does not provide SIB1 and that there is hence no CORESET#0 configured in MIB (see TS 38.213, clause 13). In this case, the field pdcch-ConfigSIB1 may indicate the frequency positions where the UE may (not) find a SS/PBCH with a control resource set and search space for SIB1 (see TS 38.213, clause 13).
subCarrierSpacingCommon
Subcarrier spacing for SIB7, Msg.2/4 for initial access, paging and broadcast SI-messages. If the UE acquires this MIB on an FRl carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.
dmrs-TypeA-Position
Position of (first) DM-RS for downlink (e.g., PDSCH) and uplink (e.g., PUSCH), pos2 represents the $2^{nd}$ symbol in a slot and pos2 represents the $3^{rd}$ symbol in a slot.

When selecting an initial cell, the UE may assume that a half-frame having the SSB is repeated at a period of 20 ms. The UE may check whether a Control Resource Set (CORESET) (e.g., CORESET #0) for a Type0-PDCCH common search space is present based on the MIB. In $k_{SSB}<=23$ (for FR1) or $k_{SSB}<=11$ (for FR2), the UE may determine that the CORESET for the Type0-PDCCH common search space is present. In the case of $k_{SSB}>23$ (for FR1) or $k_{SSB}>11$ (for FR2), the UE may determine that the CORESET for the Type0-PDCCH common search space is not present. The Type0-PDCCH common search space may be a type of a PDCCH search space and may be used to transmit a PDCCH for scheduling an SI message. When the Type0-PDCCH common search space is present, the UE may determine (i) a plurality of consecutive RBs included in the CORESET (e.g., CORESET #0) and one or more consecutive symbols and (ii) a PDCCH occasion (i.e., a location in the time domain for reception of the PDCCH) (e.g., search space #0) based on information in the MIB (e.g., pdcch-ConfigSIB1). When the Type0-PDCCH common search space is not present, the pdcch-ConfigSIB1 may provide information on a frequency position at which SSB/SIB1 is present and a frequency range in which the SSB/SIB1 is not present.

The SIB1 may include information related to the availability and scheduling (e.g., a transmission period and an SI-window size) of the remaining SIBs (hereinafter an SIBx, x being an integer equal to or greater than 2). For example, the SIB1 may inform whether SIBx is periodically broadcast or is provided in response to a request of the UE using an on-demand method. When the SIBx is provided using the on-demand method, the SIB1 may include information required to make a request for the SI by the UE. The SIB1 may be transmitted through a PDSCH, a PDCCH for scheduling the SIB1 may be transmitted through the Type0-PDCCH common search space, and the SIB1 may be transmitted through a PDSCH indicated by the PDCCH.

The SIBx may be included in an SI message and may be transmitted through a PDSCH. Each SI message may be transmitted within a window (i.e., an SI-window) that is periodically generated.

1.5. Paging

FIG. 6 is a diagram illustrating exemplary paging to which various embodiments are applicable.

Paging and/or a paging procedure may be used by the network to transmit paging information to the UE in the RRC_IDLE or RRC_INACTIVE state. Additionally/alternatively, the paging and/or paging procedure may be used to transmit a system information (SI) modification and/or an earthquake and tsunami warning system/commercial mobile alert system (ETWS/CMAS) notification to the UE in the RRC_IDLE, RRC_INACTIVE, or RRC_CONNECTED state.

The network may initiate the paging procedure by sending a paging message to the UE at a paging occasion. The network may address one or more UEs by including one paging record (e.g., PagingRecord) for each UE in the paging message. The paging message may include a paging record list (e.g., PagingRecordList), which is a sequence of paging records.

Each paging record may include information on a UE identifier (e.g., UE Identity) and an access type (e.g., accessType). The UE identifier may be selected from among a temporary mobile subscriber identity (TMSI) (e.g., ng-5G-S-TMSI) and an inactive RNTI (I-RNTI) (e.g., fullI-RNTI). The access type may indicate whether the paging message is generated by a PDU session from non-3GPP access.

Upon receiving the paging message, the UE may operate as follows.

When the UE is in the RRC_IDLE state, if UE-Identity included in the PagingRecord matches the UE identifier assigned by higher layers, the UE may forward UE-Identity and accessType (if included) to the higher layers.

When the UE is in the RRC_INACTIVE state, for each PagingRecord included in the paging message (if included):

If UE-Identity included in PagingRecord matches fullI-RNTI stored in the UE, the UE may perform/initiate an RRC connection resumption procedure.

If UE-Identity included in PagingRecord matches the UE identifier assigned by the higher (upper) layers, the UE may perform an operation for switching to the RRC_IDLE state and/or enter the RRC_IDLE state.

1.6. DRX (Discontinuous Reception)

Figure 7:
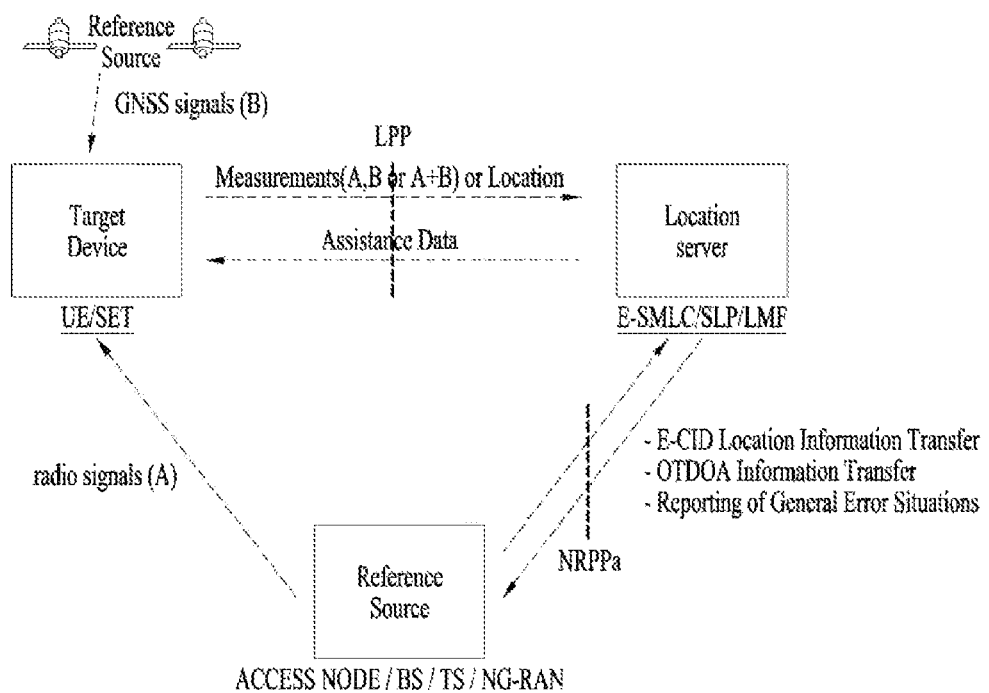
FIG. 7 is an exemplary DRX operation according to various embodiments of the present disclosure.

FIG. 7 is an exemplary DRX operation according to various embodiments of the present disclosure.

According to various embodiments of the present disclosure, the UE may perform a DRX operation in the afore-described/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

RRC_CONNECTED DRX

In the RRC_CONNECTED state, DRX is used to receive a PDCCH discontinuously. DRX in the RRC_CONNECTED state is referred to as RRC_CONNECTED DRX).

Referring to FIG. 7(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 7

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 7(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 8:
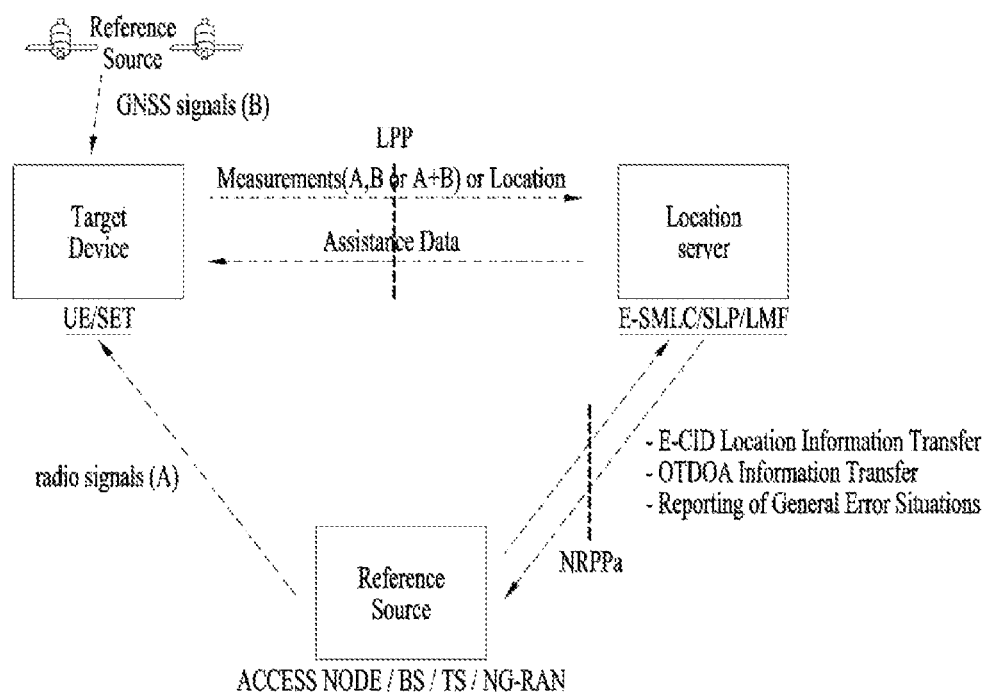
FIG. 8 is a diagram illustrating an exemplary positioning protocol configuration for user equipment (UE) positioning, which is applicable to various embodiments of the present disclosure.

FIG. 8 is a diagram illustrating an exemplary positioning protocol configuration for positioning a UE, to which various embodiments are applicable.

Referring to FIG. 8, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1))$$ [Equation 1]

c(i) may be a pseudo-random sequence. A pseudo-random sequence generator may be initialized by Equation 2.

[Equation 2]

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1)(2(n_{ID,seq}^{PRS}\mod 1024) + 1) +$$

-continued $$\left(n_{ID,seq}^{PRS}\mod 1024\right)\right)\mod 2^{31}$$

$n_{s,f}^{\mu}$ may be a slot number in a frame in an SCS configuration μ. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k, l) for an antenna port p and the SCS configuration μ

$$a_{k,l}^{(p,\mu)} = \beta_{PRS} r(m)$$

$$m=0,1,\ldots$$

$$k = mK_{comb}^{PRS} + ((k_{offset}^{PRS} + k') \mod K_{comb}^{PRS})$$

$$l = l_{start}^{PRS}, l_{start}^{PRS}+1, \ldots, l_{start}^{PRS}+L_{PRS}-1 \quad \text{[Equation 3]}$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of {2, 2}, {4, 2}, {6, 2}, {12, 2}, {4, 4}, {12, 4}, {6, 6}, {12, 6} and/or {12, 12}. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 8.

TABLE 8

| | Symbol number within the downlink PRS resource $l-l_{start}^{PRS}$ | | | | | | | | | | |
|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$(N_{slot}^{frame,\mu}n_f + n_{s,f}^{\mu} - T_{offset}^{PRS} - T_{offset,res}^{PRS}) \mod 2^{\mu}T_{per}^{PRS} \in \{iT_{gap}^{PRS}\}_{i=0}^{T_{rep}^{PRS}-1}$$

[Equation 4]

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{0, 1, \ldots, T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5,8, 10,16,20,32,40,64,80,160,320,640,1280,2560,5120,10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture

Figure 9:
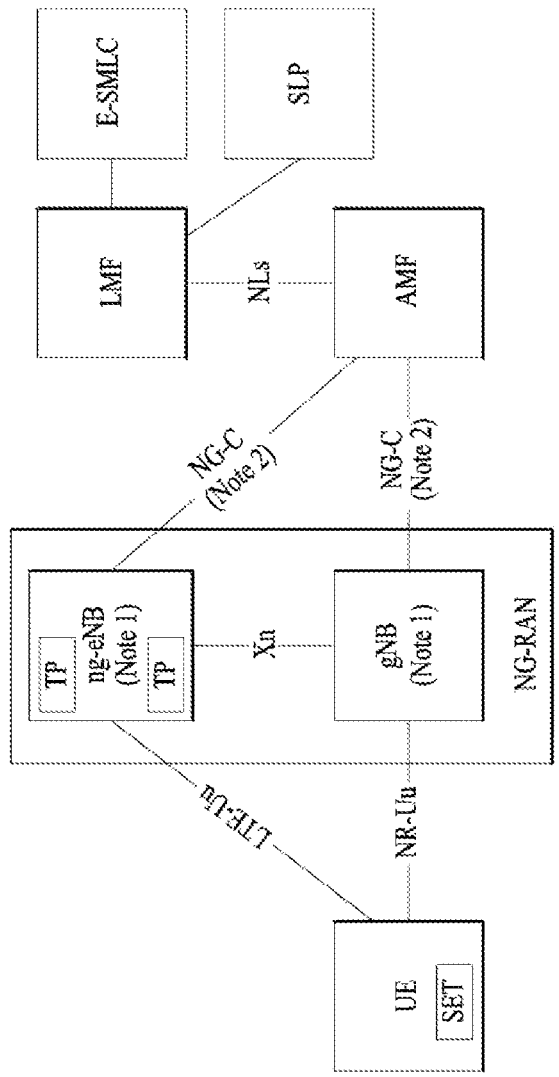
FIG. 9 is a diagram illustrating an example of an architecture of a system for positioning a UE, to which various embodiments of the present disclosure are applicable.

FIG. 9 illustrates an exemplary system architecture for measuring positioning of a UE to which various embodiments are applicable.

Referring to FIG. 9, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 10:
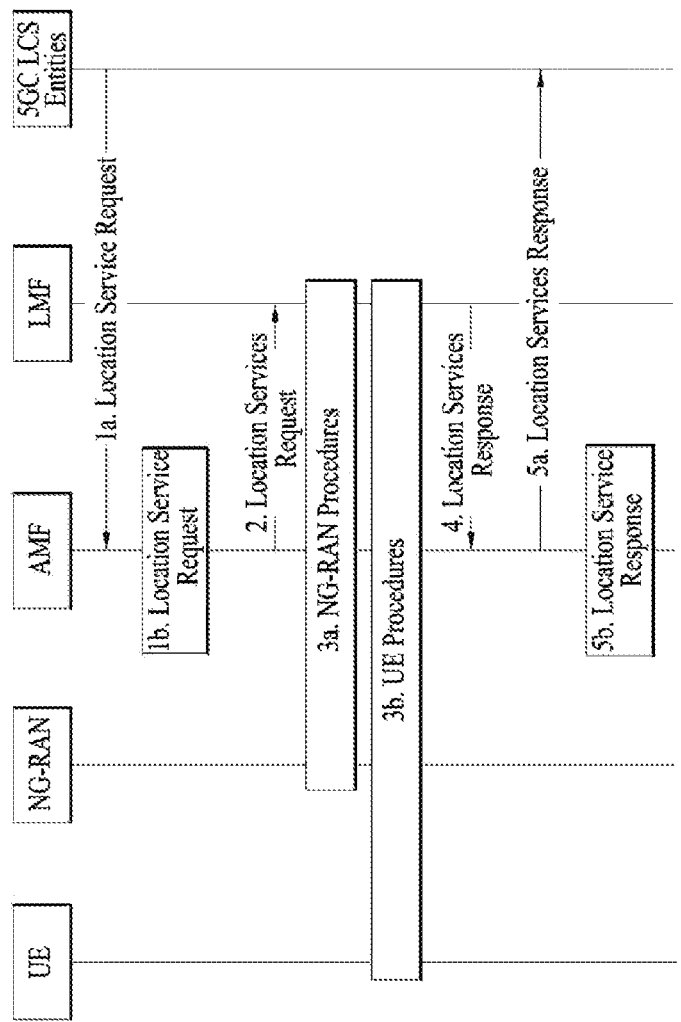
FIG. 10 is a diagram illustrating an example of a procedure of positioning a UE, to which various embodiments of the present disclosure are applicable.

FIG. 10 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 11 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 10. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC.

Figure 11:
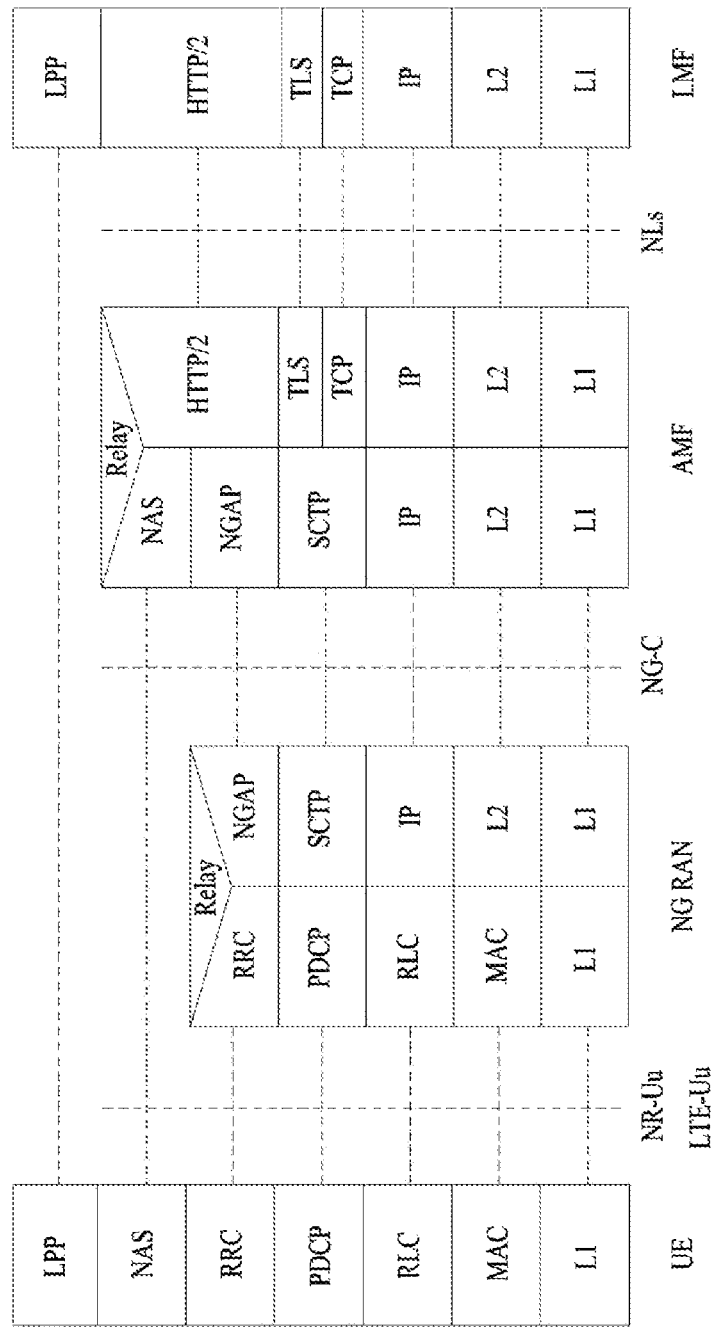
FIG. 11 is a diagram illustrating protocol layers for supporting LTE positioning protocol (LPP) message transmission, to which various embodiments are applicable.

If the procedure of FIG. 11 has been initiated by step 1b, the AMF may use the location service response in order to provide a location service related to an emergency call.

2.5. Positioning Protocol

LTE Positioning Protocol (LPP)

FIG. 11 illustrates an exemplary protocol layer used to support LPP message transfer between an LMF and a UE. An LPP protocol data unit (PDU) may be carried in a NAS PDU between an AMF and the UE.

Referring to FIG. 11, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 12:
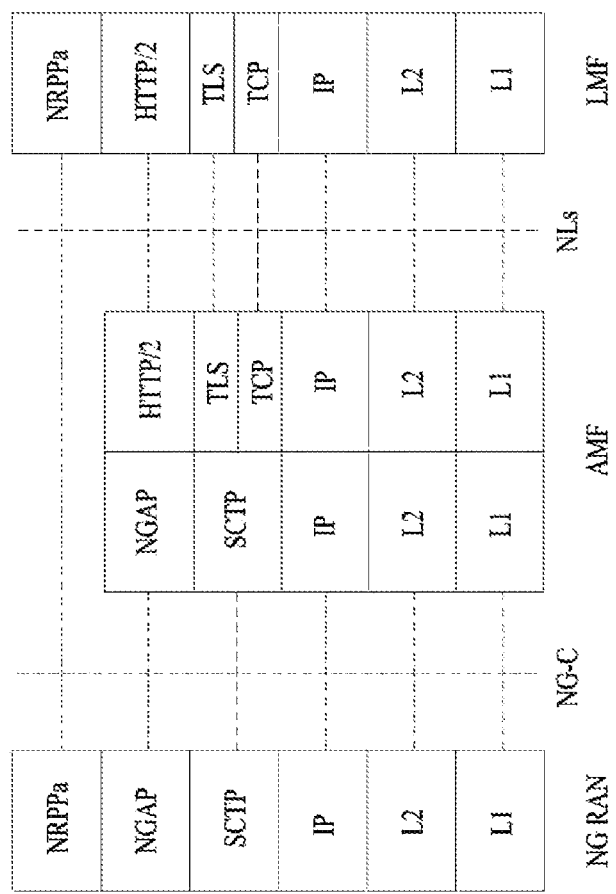
FIG. 12 is a diagram illustrating protocol layers for supporting NR positioning protocol A (NRPPa) protocol data unit (PDU) transmission, to which various embodiments are applicable.

FIG. 12 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 13:
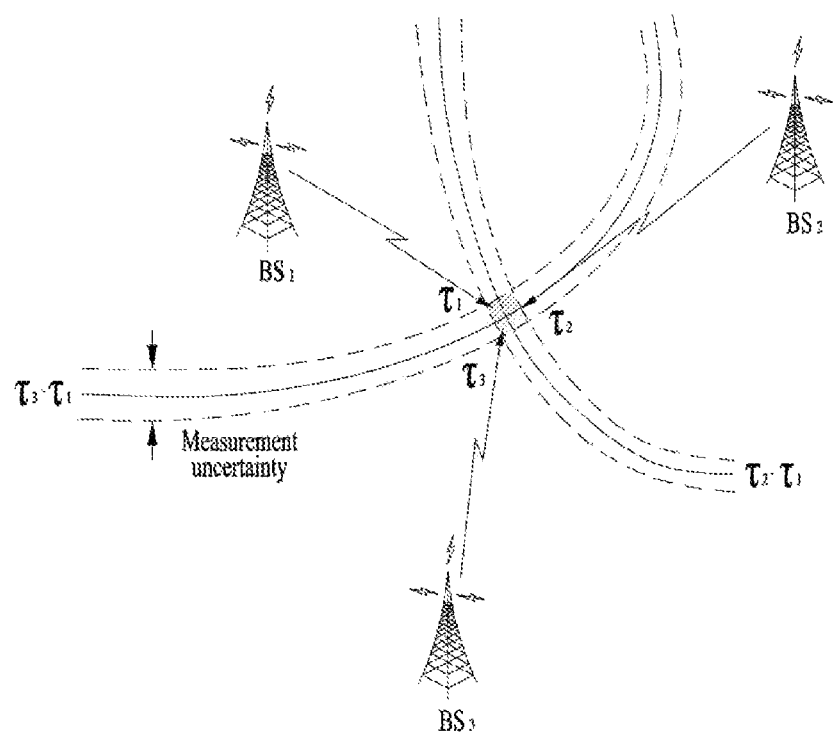
FIG. 13 is a diagram illustrating an observed time difference of arrival (OTDOA) positioning method, to which various embodiments are applicable.

FIG. 13 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 5]

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RS SI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 14 is a diagram illustrating an exemplary multi-round trip time (multi-RTT) positioning method to which various embodiments are applicable.

Referring to FIG. 14(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 14(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 9 shows an exemplary SRS request field.

TABLE 9

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $1^{st}$ set of serving cells configured by higher layers |
| 10 | SRS resource set(s) configured by SRS-ResourceSet with higher layer parameter aperiodicSRS-ResourceTrigger set to 2 of an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

In Table 9 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

CMAS: commercial mobile alert system. For example, the CMAS may be a public warning system (PWS) developed to provide multiple simultaneous warning notifications.

ECID: enhanced cell identifier

ETWS: earthquake and tsunami warning system. For example, the ETWS may be a public warning system developed to satisfy regulatory requirements for warning notifications related to earthquakes and/or tsunamis, and the like. For example, ETWS alert notifications may include an ETWS primary notification (short notification) and/or an ETWS secondary notification (detailed information).

GNSS: global navigation satellite system

LMF: location management function

OTDOA: observed time difference of arrival posSIB: positioning system information block. The posSIB may refer to an SIB including information related to positioning. The posSIB may include assistance data for positioning. The assistance data may be included in a subfield (e.g., SIBpos) of the posSIB. The assistance data may include a PRS identifier (ID) for identifying a DL PRS resource. The assistance data may be configured by the server/LMF and transmitted through the BS to the UE in the posSIB. In the description of various embodiments, positioning system information may be included in the SIB including information related to positioning. In the description of various embodiments, system information that is not positioning system information and/or does not include positioning system information may be referred to as normal system information, legacy system information, and/or system information. In the description of various embodiments, an SIB that is not the posSIB and/or includes no posSIB may be referred to as a normal SIB, a legacy SIB, and/or an SIB.

PRS: positioning reference signal

RTT: round trip time

RSTD: reference signal time difference/relative signal time difference

SIB: system information block

SSB: synchronization signal block. The SSB may refer to a synchronization signal/physical broadcast channel (SS/PBCH) block.

TRP: transmission and reception point (TP: transmission point)

In the description of various embodiments, a BS may be understood as a comprehensive term including a remote radio head (RRH), an eNB, a gNB, a TP, a reception point (RP), a relay, and the like.

In the description of various embodiments, the expression 'greater than/above A' may be replaced with the expression 'above/greater than A'.

In the description of various embodiments, the expression 'less than/below B' may be replaced with the expression 'below/less than B'.

In the description of various embodiments, a UE-based positioning method may be related to a method in which the UE directly calculates/obtains its own location/positioning information.

In the description of various embodiments, a UE-assisted positioning method may be related to a method in which the UE calculates/obtains and reports measurements related to UE location/positioning (for example, values used by the BS/(location) server/LMF for UE positioning, for example, measurements for at least one of RSTD, AoA, AoD, RTT, or ToA), and upon receiving the measurements, the network node (e.g., BS/server/LMF) calculates/obtains location/positioning information on the UE.

In the wireless communication system to which various embodiments are applicable (e.g., wireless communication system supporting standard technologies of Release-16 and/or earlier), UE positioning may be supported for RRC connected UEs. However, due to the necessity that the BS/server (location server)/LMF needs to accurately manage location/positioning information on the UE in the RRC idle/inactive state and/or the necessity that the RRC idle/inactive UE needs to autonomously manage its location/positioning information, support for positioning of the UE in the RRC idle/inactive state is being considered. For example, when the positioning of the UE in the RRC idle/inactive state is supported, there may be benefits in terms of time and/or power required for UE state transitions.

For example, for the UE in the RRC idle/inactive state, since the direct connection between the UE and BS/server/LMF is limited (e.g., there is no LPP connection), a positioning mechanism based on promised/defined/established rules/mechanisms may be required. For example, it may be necessary to discuss how to deliver request information on positioning measurement/measurement report (MR)/location information/positioning information to the UE.

Various embodiments may be related to a method of positioning a UE in the RRC idle/inactive state based on paging. For example, various embodiments may be related to UE-based and/or UE-assisted positioning methods based on paging. Hereinafter, various embodiments will be described based on the UE-based positioning method based on paging but the various embodiments are not limited thereto. For example, various embodiments may be applied to the UE-assisted positioning method.

In the wireless communication system (e.g., NR system) to which various embodiments are applicable, cell-specific and/or area-specific system information may be broadcast and/or transmitted to a UE according to a request from the corresponding UE.

In the wireless communication system to which various embodiments are applicable, a posSIB carrying positioning system information (e.g., including assistance data) may be defined.

For example, when system information is modified, the BS/CN (core network) may use paging to inform the UE that the system information is modified. However, for example, a modification in the system information may not contain a modification in positioning system information. For example, considering that there is no discussed/specified method of informing a modification in the posSIB, when there is a modification of the positioning system information, the BS/server/LMF needs to provide the corresponding information to UE.

In the wireless communication system to which various embodiments are applicable, when there is a modification in system information, except for SIBs (e.g., SIBs 6, 7, and 8) carrying system information such as the ETWS/CMAS, the UE may require an additional procedure for checking/identifying which SIB is modified based on an MIB, SIB1, and/or information scheduled by SIB1. However, considering that there are a relatively large number of posSIBs and there are many types of posSIBs, if the UE starts obtaining the MIB again due to a modification in one posSIB, it may be inefficient in terms of complexity and latency.

Various embodiments may be related to a method of informing a UE of a modification in system information related to positioning based on paging. For example, the UE may be in the RRC idle/inactive/connected state.

According to various embodiments, the BS/server/LMF may transmit paging to provide information on a modification in positioning system information to the UE, in addition to and/or separately from the following purposes: triggering RRC connection setup, system information modification, PWS/ETWS notification, etc.

Various embodiments may be related to a method and/or operation in which the UE and BS/server/LMF use paging.

Figure 15:
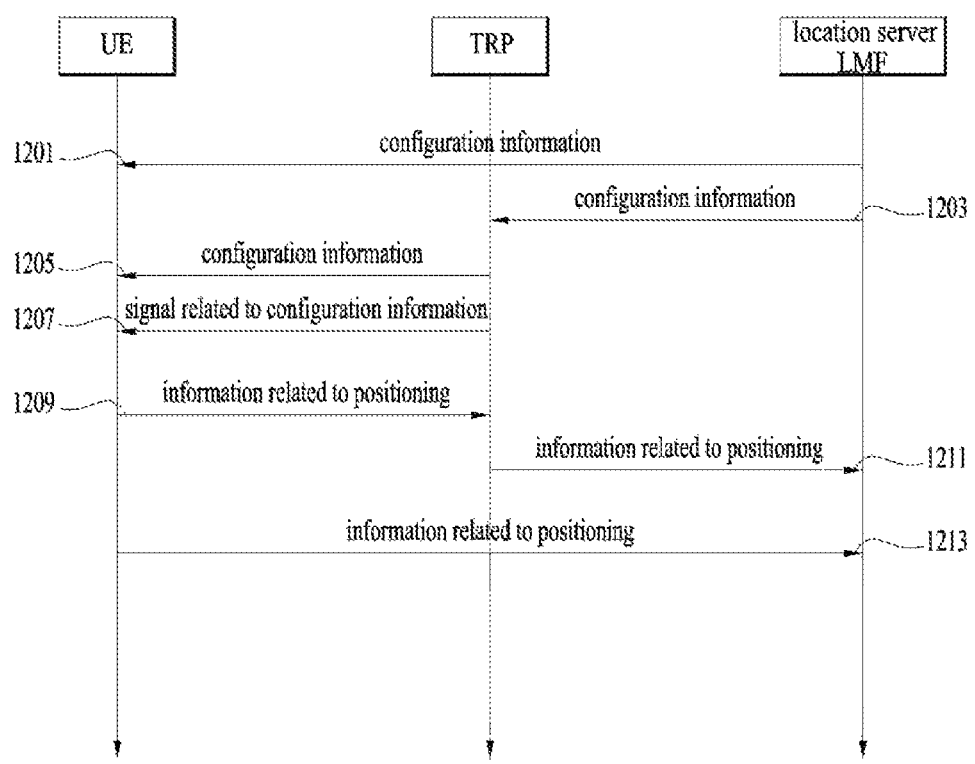
FIG. 15 is a simplified diagram illustrating a method of operating a UE, a transmission and reception point (TRP), a location server, and/or a location management function (LMF) according to various embodiments.

FIG. 15 is a simplified diagram illustrating an operating method of a UE, a TRP, a location server, and/or an LMF according to various embodiments.

Referring to FIG. 15, in operation 1201 according to various embodiments, the location server and/or the LMF may transmit configuration indicated to the UE and the UE may receive the configuration information.

In operation 1203 according to various embodiments, the location server and/or the LMF may transmit reference configuration information to the TRP and the TRP may receive the reference configuration information. In operation 1205 according to various embodiments, the TRP may transmit the reference configuration information to the UE and the UE may receive the reference configuration information. In this case, operation 1201 according to various embodiments may be omitted.

In contrast, operations 1203 and 1205 according to various embodiments may be omitted. In this case, operation 1201 according to various embodiments may be performed.

That is, operation 1201 according to various embodiments, and operations 1203 and 1205 according to various embodiments may be selectively performed.

In operation 1207 according to various embodiments, the TRP may transmit a signal related to the configuration information and the UE may receive the signal related to the configuration information. For example, the signal related to the configuration information may be a signal for positioning of the UE.

In operation 1209 according to various embodiments, the UE may transmit a signal related to positioning to the TRP and the TRP may receive the signal related to positioning. In operation 1211 according to various embodiments, the TRP may transmit the signal related to positioning to the location server and/or the LMF and the location server and/or the LMF may receive the signal related to positioning.

In operation 1213 according to various embodiments, the UE may transmit the signal related to positioning to the location server and/or the LMF and the location server and/or the LMF may receive the signal related to positioning. In this case, operations 1209 and 1211 according to various embodiments may be omitted.

In contrast, operation 1213 according to various embodiments may be omitted. In this case, operations 1209 and 1211 according to various embodiments may be performed.

That is, operations 1209 and 1211 according to various embodiments, and operation 1213 according to various embodiments may be selectively performed.

According to various embodiments, the signal related to positioning may be obtained based on the configuration information and/or the signal related to the configuration information.

Figure 16:
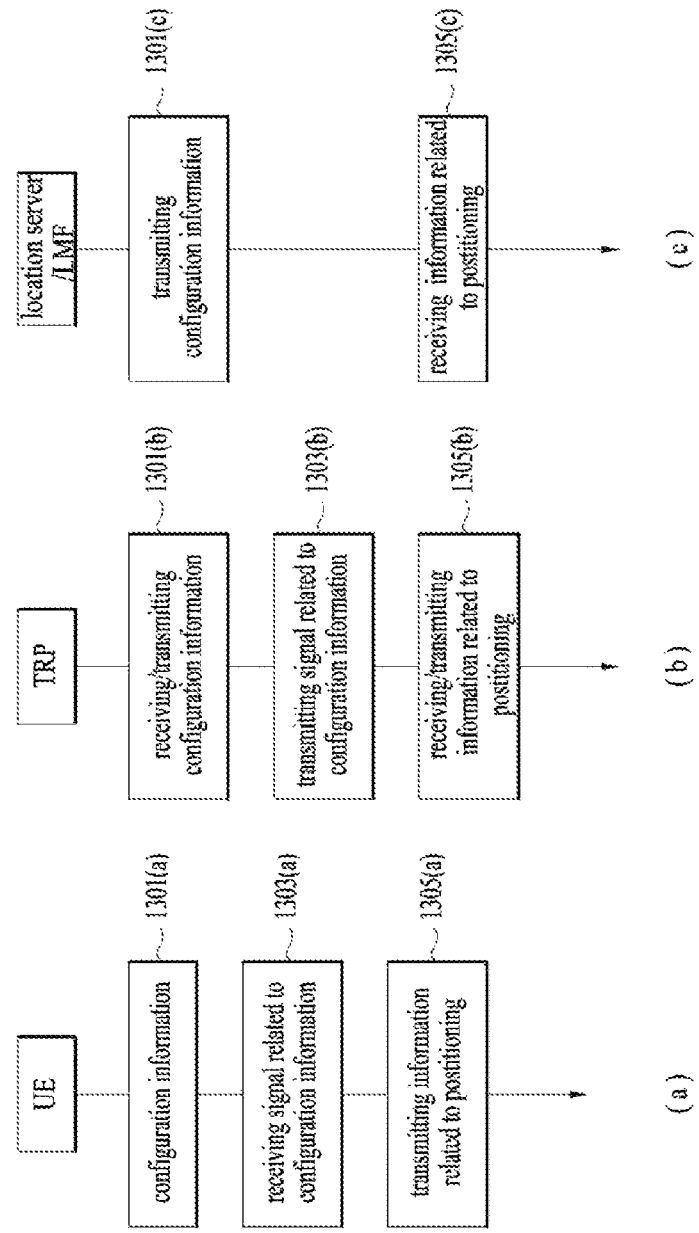
FIG. 16 is a simplified diagram illustrating a method of operating a UE, a TRP, a location server, and/or an LMF according to various embodiments.

FIG. 16 is a simplified diagram illustrating an operating method of a UE, a TRP, a location server, and/or an LMF according to various embodiments.

Referring to FIG. 16(a), in operation 1301(a) according to various embodiments, the UE may receive configuration information.

In operation 1303(a) according to various embodiments, the UE may receive a signal related to the configuration information.

In operation 1305(a) according to various embodiments, the UE may transmit information related to positioning.

Referring to FIG. 16(b), in operation 1301(b) according to various embodiments, the TRP may receive configuration information from the location server and/or the LMF and transmit the configuration information to the UE.

In operation 1303(b) according to various embodiments, the TRP may transmit a signal related to the configuration information.

In operation 1305(b) according to various embodiments, the TRP may receive information related to positioning and transmit the information related to positioning to the location server and/or the LMF.

Referring to FIG. 16(c), in operation 1301(c) according to various embodiments, the location server and/or the LMF may transmit configuration information.

In operation 1305(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Various embodiments may be related to a method in which the BS/server/LMF informs the UE in the RRC idle/inactive/connected state of a modification in system information related to positioning when the system information related to positioning is modified. For example, the UE may receive a DL RS (e.g., PRS, SSB, CSI-RS, etc.) for positioning and/or transmit a UL RS (e.g., SRS, etc.) for positioning based on the modification in the system information related to positioning.

In the wireless communication system (e.g., NR system) to which various embodiments are applicable, paging may be initiated with transmission of a paging message on a preconfigured/predefined paging occasion. According to various embodiments, paging may be transmitted to provide information about a modification in positioning system information to the UE, in addition to and/or separately from the following purposes: triggering RRC connection setup, system information modification, PWS/ETWS notification, etc. According to various embodiments, whether there is a modification in positioning system information may be notified based on paging.

In the wireless communication system (e.g., NR system) to which various embodiments are applicable, a paging message may carry/include only paging record information, unlike the LTE system. For example, information on a modification/change in system information and/or information on an ETWS/CMAS indication may be designated/defined/set as a short message, and the corresponding information may be transmitted to the UE over a PDCCH (DCI).

In the wireless communication system (e.g., NR system) to which various embodiments are applicable, information on a system information (SI) modification and/or information on a CMAS/ETWS indication transmitted in a paging message may be designated/defined as a short message. For example, the BS/server/LMF may transmit the corresponding information to UE over a PDCCH (DCI).

According to various embodiments, DCI for and/or related to paging may be used for positioning. For example, the corresponding DCI may contain information related to a short message.

In the following, DCI format 1_0 is described as an example of the corresponding DCI. However, this is merely exemplary for various embodiments, and the format of the corresponding DCI is not limited thereto. In the description of various embodiments, DCI format 1_0 may be replaced with DCI and/or a signal for paging and/or related to paging. The DCI and/or signal may be identified by a related identifier. For example, the DCI may have a cyclic redundancy check (CRC) scrambled with a radio network temporary identifier (RNTI) related to paging. The RNTI related to paging may be a paging-RNTI (P-RNTI).

In the wireless communication system (e.g., NR system, etc.) to which various embodiments are applicable, at least one of the following information may be transmitted by DCI format 1_0 having a CRC scrambled with a P-RNTI.

Short message indicator: 2 bits

Short message: 8 bits. When only scheduling information for paging is carried, the corresponding bit field may be reserved.

Frequency domain resource assignment: $\lceil \log_2(N_{RB}^{DL,BWP}(N_{RB}^{DL,BWP}+1)/2) \rceil$. If only a short message is carried, the corresponding bit field may be reserved. $N_{RB}^{DL,BWP}$ may denote the size of control resource set (CORESET) 0 (i.e., CORESET for transmitting a PDCCH scheduling SIB1).

Time domain resource assignment: 4 bits. If only the short message is carried, the corresponding bit field may be reserved.

Virtual resource block-to-physical resource block (VRB-to-PRB) mapping: 1 bit. If only the short message is carried, the corresponding bit field may be reserved.

Modulation and coding scheme (MCS): 5 bits. If only the short message is carried, the corresponding bit field may be reserved.

Transport block (TB) scaling: 2 bits. If only the short message is carried, the corresponding bit field may be reserved.

Reserved bit: 8 bits for operation in a cell with a shared spectrum. Otherwise, 6 bits.

The short message may be transmitted with and/or without a paging message associated with a PDCCH using a P-RNTI. For example, it may be transmitted in the short message field included in DCI format 1_0.

For example, the short message may be defined as shown in Table 10. In Table 10, bit 1 may mean the most significant bit (MSB), and the following bits may be sequential bits after the MSB.

TABLE 10

Bit Short Message 1 systemInfoModification
  If set to 1; indication of a BCCH modification other than SIB6, SIB7 and SIB8.
2 etwsAndCmasIndication
  If set to 1; indication of an ETWS primary notification and/or an ETWS secondary notification and/or a CMAS notification.
3 stopPagingMonitoring
  This bit can be used for only operation with shared spectrum channel access and if nrofPDCCH-MonitoringOccasionPerSSB-InPO is present.
  If set to 1; indication that the UE may stop monitoring PDCCH occasion(s) for paging in this Paging Occasion as specified in TS 38.304 [20], clause 7.1.
4-8 Not used and shall be ignored by UE if received.

Bit 1 may correspond/be mapped to systemInfoModification. For example, if Bit 1 is set to 1 (or 0), a modification in a broadcast control channel (BCCH) and/or SIB except for SIB6, SIB7, and SIB8 may be indicated.

Bit 2 may correspond/be mapped to etwsAndCmasIndication. For example, if Bit 2 is set to 1 (or 0), an ETWS primary notification, ETWS secondary notification, and/or CMAS notification may be indicated.

Bit 3 may correspond/be mapped to stopPagingMonitoring. For example, Bit 3 may be used only when there is shared spectrum channel access and when nrofPDCCH-MonitoringOccasionPerSSB-InPO is present. For example, if Bit 3 is set to 1 (or 0), it may indicate to terminate monitoring of a PDCCH occasion for paging within a corresponding paging occasion.

Bits 4 to 8 may be reserved and/or not used. For example, upon receiving Bits 4 to 8, the UE may ignore Bits 4 to 8.

In the wireless communication system (e.g., NR system) to which various embodiments are applicable, the short message indicator (2 bits) may be defined as shown in Table 11.

TABLE 11

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

When the value of the bit field is '00', it may correspond/be mapped to a reserved state. When the value of the bit field is '01', it may correspond/be mapped to a state in which only scheduling information for paging is included in DCI. When the value of the bit field is '10', it may correspond/be mapped to a state in which only a short message is included in DCI. When the value of the bit field is '11', it may correspond/be mapped to a state in which both scheduling information for paging and a short message are included in DCI.

If etwsAndCmasIndication is '1', the UE may immediately acquire SIB1 again. The UE may obtain SIB6, SIB7, and/or SIB8 according to scheduling information in SIB1.

If systemInfoModification is '1', the UE may perform a procedure for obtaining an MIB and/or SIB1 in the next modification period and obtaining (at least one of) all remaining system information scheduled by SIB1.

According to various embodiments, when there is a modification in a posSIB, the BS/server/LMF may inform the UE of the modification in the corresponding information. For example, at least one of the following methods and/or any combinations thereof may be applied.

Method 1: Using Short Message

According to Method 1 in accordance with various embodiments, one or more bits (e.g., 1 bit) among the remaining 5 bits (Bits 4 to 8) of the short message may be used to provide/indicate a modification in positioning system information.

For example, when there are modifications in information of SIBs (e.g., SIB6/SIB7/SIB8) related to the CMAS and/or ETWS, the UE may immediately acquire SIB1 first and then acquire each SIB based on scheduling information.

According to Method 1 in accordance with various embodiments, 1 bit may be allocated to inform whether the positioning system information is modified. For example, when the corresponding bit is '1' (or '0), the UE may obtain SIB1 and then obtain related posSIBs based on scheduling information (included in SIB1). When the corresponding bit is '0' (or '1'), the UE may identify/recognize that there are no modifications in posSIBs.

For example, when information on modifications/changes in the posSIBs depends on systemInfoModification, that is, when there is no 1 bit for a modification/change in positioning system information, the UE may know which information is modified/changed only after acquiring an MIB and SIB1 and then acquiring all system information as well as the posSIBs, which may cause inefficiency in terms of complexity and latency.

According to various embodiments, for a posSIB in which an RRC message and/or timer is capable of being configured separately (independently of normal system information), 1 bit may be allocated to directly indicate whether the positioning system information is modified (as in the CMAS/ETWS). According to various embodiments, the UE may obtain only the positioning system information instead of obtaining all types of scheduled SIBs, and thus it may be highly efficient in terms of time and power consumption. According to various embodiments, since the posSIB may be distinguished from other SIBs, a modification in the posSIB may be indicated separately from other SIBs, thereby reducing complexity, latency, and power consumption For example, the short message may be configured/defined as shown in Table 12 below.

TABLE 12

| Bit | Short Message |
|---|---|
| 1 | systemInfoModification<br>If set to 1; indication of a BCCH modification other than SIB6, SIB7 and SIB8. |
| 2 | etwsAndCmasIndication<br>If set to 1; indication of an ETWS primary notification and/or an ETWS secondary notification and/or a CMAS notification. |
| 3 | stopPagingMonitoring<br>If set to 1; stop monitoring PDCCH occasions(s) for paging in this PO. |
| 4 | positioningInfoModification<br>If set to 1; Indication of a positioning system information modification |
| 5-8 | Not used and shall be ignored by UE if received. |

Bit 1 (first MSB) may correspond/be mapped to systemInfoModification. For example, if Bit 1 is set to 1 (or 0), a modification in a BCCH/SIB except for SIB6, SIB7, and SIB8 may be indicated.

Bit 2 may correspond/be mapped to etwsAndCmasIndication. For example, if Bit 2 is set to 1 (or 0), an ETWS primary notification, ETWS secondary notification, and/or CMAS notification may be indicated.

Bit 3 (third MSB) may correspond/be mapped to stopPagingMonitoring. For example, Bit 3 may be used only when there is shared spectrum channel access and when nrofPDCCH-MonitoringOccasionPerSSB-InPO is present. For example, if Bit 3 is set to 1 (or 0), it may indicate to terminate monitoring of a PDCCH occasion for paging within a corresponding paging occasion.

Bit 4 (4th MSB) may correspond/be mapped to positioningInfoModification. For example, if Bit 4 is set to 1 (or 0), a modification in positioning system information may be indicated.

In the wireless communication system to which various embodiments are applicable, when there is a modification in normal system information, the UE may use the current system information as it is until when a modification periodicity starts. That is, for example, the UE may perform a procedure for obtaining a new MIB and/or SIB #n (where n is a natural number) after waiting based on the modification periodicity configured for the system information.

For example, the same operation may be performed for positioningInfoModification. As another example, if positioning system information needs to be modified dynamically and/or immediately as in the ETWS and/or CMAS, additional information on a guaranteed and/or valid period for previously transmitted positioning system information may be introduced/defined/configured. For example, upon receiving the corresponding information, the UE may interpret that the previously transmitted and/or obtained positioning system information is valid within the corresponding guaranteed and/or valid period. This may prevent the UE from failing to recognizing whether the received positioning system information (e.g., assistance data included therein) is valid until a predetermined time and performing measurements for positioning based on incorrect information when no guaranteed and/or valid period is configured.

According to various embodiments, the remaining bits of the short message may be used at the level of symbols, slots, subframes, and/or frames for the guaranteed and/or valid period, and/or an additional DCI bit field may be defined and used. The corresponding information may be provided by the short message according to various embodiments. For example, the guaranteed and/or valid period may be configured/configured in units of symbols, slots, subframes, and/or frames and/or combinations thereof.

For example, Bits 5 to 8 may be reserved and/or not used. For example, when the UE receives Bits 5 to 8, the UE may ignore Bits 5 to 8. As another example, one or more bits among Bits 5 to 8 may be used to indicate information on the guaranteed and/or valid period.

Although it is assumed in the description of various embodiments that the size of the bit field for indicating whether the positioning system information is modified is 1 bit, various embodiments are not limited thereto. According to various embodiments, the size of the bit field for indicating whether the positioning system information is modified may have various values other than 1 bit.

For example, the size of the bit field for indicating whether the positioning system information is modified may be 2 bits. When the bit field for indicating whether the positioning system information is modified has a first value, it may correspond/be mapped to that the positioning system information is modified. When the bit field for indicating whether the positioning system information is modified has a second value, it may correspond/be mapped to that the positioning system information is not modified. For example, if the bit field for indicating whether the positioning system information is modified has other values except for the first or second value, it may correspond/be mapped to that bits are reserved and/or the UE is provided with other indications/configurations.

Method 2: Using Paging Message

In Method 1 in accordance with various embodiments described above, a modification in system information may be indicated cell-specifically and/or group-specifically.

According to Method 2 in accordance with various embodiments, a modification in system information may be indicated UE-specifically.

According to various embodiments, positioning information and/or information on a modification in positioning system information may be provided for each record in addition to and/or separately from stacked recording information on the UE present in a paging message. According to various embodiments, the information on the modification of the positioning system information may be given for each record. According to various embodiments, a specific posSIB type may be indicated, and/or only modification information may be indicated.

For example, information shown in Table 13 below may be configured.

TABLE 13

```
PagingRecordList ::= SEQUENCE (SIZE(1..maxNrofPageRec))
OF PagingRecord
PagingRecord ::= SEQUENCE {
    ue-Identity                PagingUE-Identity,
    accessType                 ENUMERATED {non3GPP}
OPTIONAL, -
    possystemInfoModification  ENUMERATED { true }
- Need N
    ...
}
```

Referring to Table 13, an identity (PagingUE-Identity), an access type (accessType), and/or information on a modification in positioning system information (possystemInfo-Modification) may be indicated in each paging record. For example, the information on the modification of the positioning system information may be UE-specific information for a UE identified by its identity.

According to various embodiments, if information on a specific posSIB type is transmitted, the UE may acquire the designated posSIB type by acquiring SIB1 and using scheduling information of the corresponding posSIB type.

On the other hand, according to various embodiments, if there is only modification information, the UE may acquire all posSIB types included in a scheduling list from SIB1, which may be independent of modified bits of system information in the short message. For example, the modification in the system information included in the short message may not be related to the modification of the positioning system information.

According to various embodiments, the specific posSIB type may be designated/indicated according to at least one of a method of specifying/indicating a UE-specific type and/or a method of specifying/indicating a group-specific type in consideration of a mapping relationship with assistance data as shown in Table 14. Additionally/alternatively, according to various embodiments, information on a guaranteed and/or valid period for positioning system information may be (additionally) provided as described above.

TABLE 14

| | posSibType [12] | assistanceDataElement |
|---|---|---|
| GNSS Common Assistance Data (clause 6.5.2.2) | posSibType1-1 | GNSS-ReferenceTime |
| | posSibType1-2 | GNSS-ReferenceLocation |
| | posSibType1-3 | GNSS-IonosphericModel |
| | posSibType1-4 | GNSS-EarthOrientationParameters |
| | posSibType1-5 | GNSS-RTK-ReferenceStationInfo |
| | posSibType1-6 | GNSS-RTK-CommonObservationInfo |
| | posSibType1-7 | GNSS-RTK-AuxiliaryStationData |
| | posSibType1-8 | GNSS-SSR-CorrectionPoints |
| GNSS Generic Assistance Data (clause 6.5.2.2) | posSibType2-1 | GNSS-TimeModelList |
| | posSibType2-2 | GNSS-DifferentialCorrections |
| | posSibType2-3 | GNSS-NavigationModel |
| | posSibType2-4 | GNSS-RealTimeIntegrity |
| | posSibType2-5 | GNSS-DataBitAssistance |

TABLE 14-continued

| posSibType [12] | assistanceDataElement |
|---|---|
| posSibType2-6 | GNSS-AcquisitionAssistance |
| posSibType2-7 | GNSS-Almanac |
| posSibType2-8 | GNSS-UTC-Model |
| posSibType2-9 | GNSS-AuxiliaryInformation |
| posSibType2-10 | BDS-DifferentialCorrections |
| posSibType2-11 | BDS-GridModelParameter |
| posSibType2-12 | GNSS-RTK-Observations |
| posSibType2-13 | GLO-RTK-BiasInformation |
| posSibType2-14 | GNSS-RTK-MAC-CorrectionDifferences |
| posSibType2-15 | GNSS-RTK-Residuals |
| posSibType2-16 | GNSS-RTK-FKP-Gradients |
| posSibType2-17 | GNSS-SSR-OrbitCorrections |
| posSibType2-18 | GNSS-SSR-ClockCorrections |
| posSibType2-19 | GNSS-SSR-CodeBias |
| posSibType2-20 | GNSS-SSR-URA |
| posSibType2-21 | GNSS-SSR-PhaseBias |
| posSibType2-22 | GNSS-SSR-STEC-Correction |

According to various embodiments, one specific posSIB type such as posSibType 1-1 may be designated/indicated in the paging record, and/or posSibType 1 representing all posSIB types 1-1, 1-2, . . . , 1-8 may be designated/indicated.

According to various embodiments, when the UE is indicated with one specific posSIB type, the UE may (immediately) obtain SIB1 again and obtain corresponding positioning system information (only) by referring to scheduling information (only) related to the specific type of posSIB.

Additionally/alternatively, according to various embodiments, when the UE is indicated with a group-based posSIB type such as posSibType 1, the UE may obtain scheduling information on all posSIB types included in the corresponding group from SIB1 and then obtain all subordinate positioning system information based on the scheduling information.

Method 3: Using Short Message and Paging Message

Method 1 and/or Method 2 in accordance with various embodiments may be performed separately and/or in combination.

According to various embodiments, the BS may preferentially designate/indicate whether system information related to positioning is modified in a short message (and/or short message indicator) on a paging PDCCH. The BS may designate/indicate a specific (modified) posSIB type UE-specifically in a paging message (when the system information related to positioning is modified).

For example, the BS may transmit 1 bit indicating whether all predefined positioning system information (or at least one of the information) is modified in a short message. The BS may designate/indicate a different posSIB type for each stacked record in a paging message. The UE may check whether there is a short message from a short message indicator. When it is confirmed that the corresponding message exists, the UE may check/interpret a bit field of the short message. For example, when 1 bit related to a modification of the positioning system information is set to '1' (or '0'), the UE may decode a paging message transmitted over a PDSCH. The UE may check its UE-identity (check whether the UE-identity matches the identifier assigned to the UE) and check the indicated positioning system information type. Thereafter, the UE may obtain SIB1 again and then obtain corresponding information (posSIB/positioning system information) again based on scheduling information on the indicated posSIB type. The posSIB type transmitted in the paging message may be cell-specific, group-specific, and/or UE-specific. Details thereof may be found in Method 2 according to various embodiments.

Figure 17:
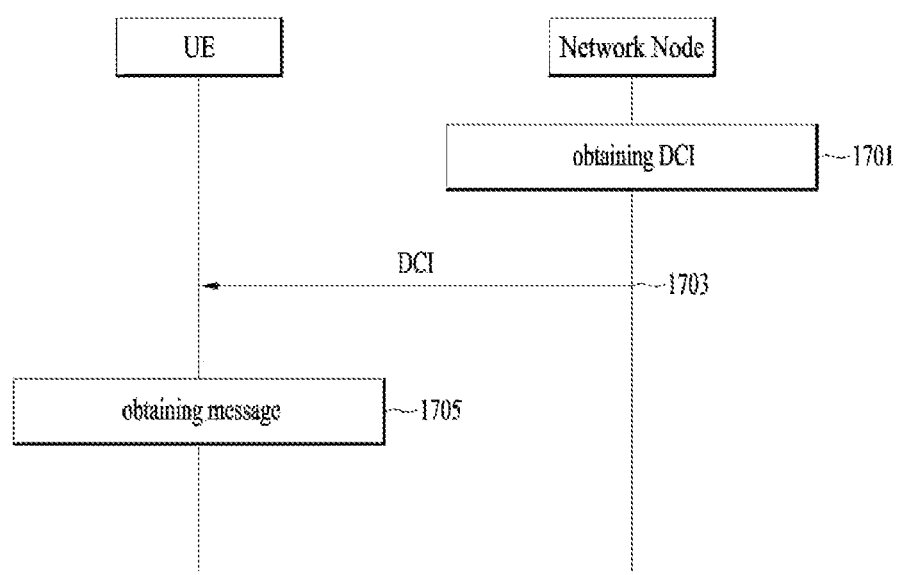
FIG. 17 is a diagram schematically illustrating a method of operating a UE and a network node according to various embodiments.

FIG. 17 is a diagram schematically illustrating a method of operating a UE and a network node according to various embodiments.

Figure 18:
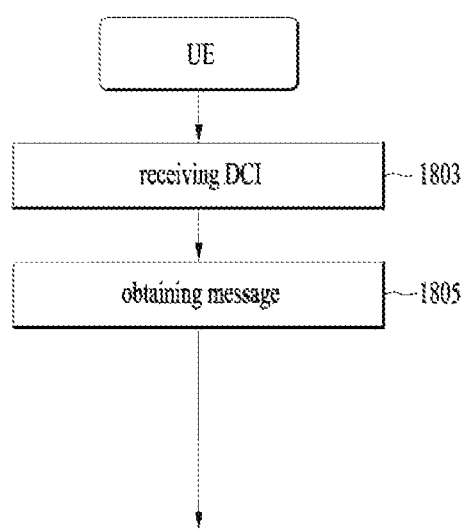
FIG. 18 is a flowchart illustrating a method of operating the UE according to various embodiments.

FIG. 18 is a flowchart illustrating a method of operating the UE according to various embodiments.

Figure 19:
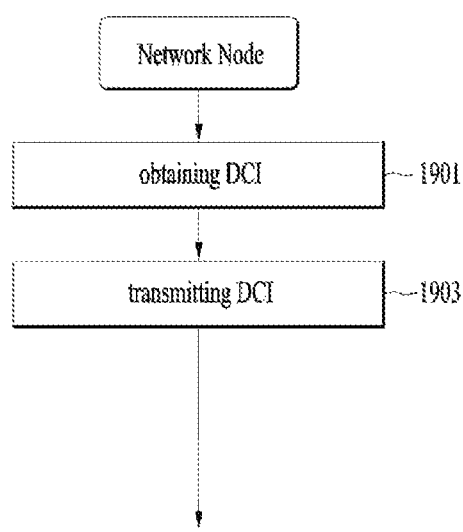
FIG. 19 is a flowchart illustrating a method of operating the network node according to various embodiments.

FIG. 19 is a flowchart illustrating a method of operating the network node according to various embodiments. For example, the network node may be a TP, a BS, a cell, a location server, an LMF, and/or any device performing the same operation.

Referring to FIGS. 17 to 19, in operations 1701 and 1901 according to various embodiments, the network node may obtain/generate DCI. For example, the DCI may have a CRC scrambled with a RNTI related to paging.

In operations 1703, 1803, and 1903 according to various embodiments, the network node may transmit the DCI, and the UE may receive the DCI.

In operations 1705 and 1903 according to various embodiments, the UE may obtain a message based on the DCI.

According to various embodiments, the message may include a plurality of bits.

According to various embodiments, the MSB among the plurality of bits may be related to an indication of a modification in system information other than positioning system information.

According to various embodiments, one or more bits except for the MSB among the plurality of bits may be related to an indication of a modification in positioning system information.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to which Various Embodiments are Applied FIG. 20 is a diagram illustrating a device that implements various embodiments.

Figure 20:
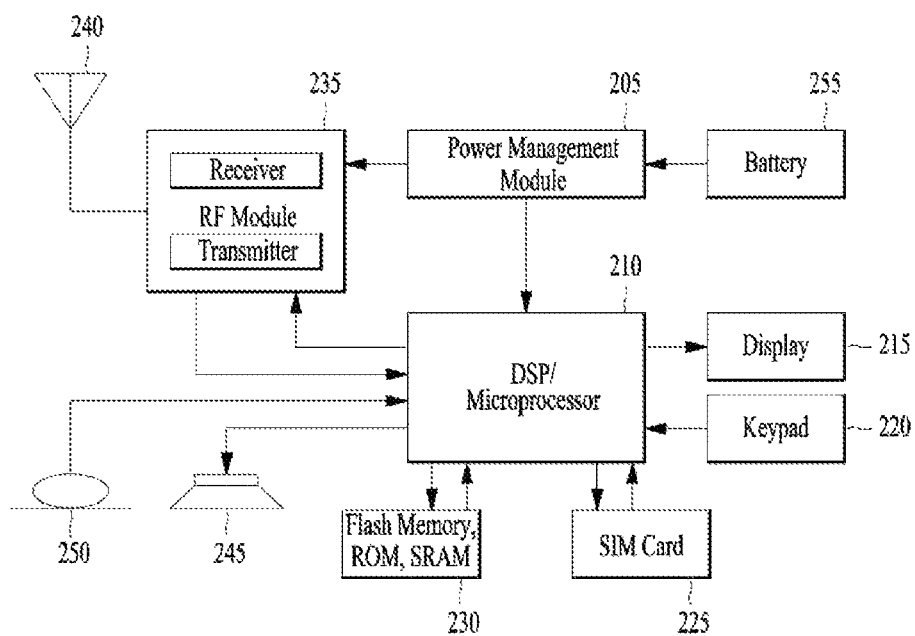
FIG. 20 is a block diagram illustrating an apparatus for implementing various embodiments of the present disclosure.

The device illustrated in FIG. 20 may be a UE and/or a BS (e.g., eNB or gNB or TP) and/or a location server (or LMF) which is adapted to perform the above-described mechanism, or any device performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or at least one processor of the communication device included in the UE) may be configured to receive DCI with a CRC scrambled with an RNTI related to paging.

According to various embodiments, the at least one processor included in the UE may be configured to obtain a message including a plurality of bits based on the DCI.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

According to various embodiments, the at least one bit with a first value may be mapped to an indication that the positioning system information is modified.

According to various embodiments, the at least one bit with a second value may be mapped to an indication that the positioning system information is not modified.

According to various embodiments, the plurality of bits may be 8 bits, and the at least one bit may be a 4th MSB of the 8 bits.

According to various embodiments, a second MSB of the 8 bits may be related to an indication of at least one of an ETWS or a CMAS.

According to various embodiments, a third MSB of the 8 bits may be related to an indication of termination of monitoring of a PDCCH for the paging.

According to various embodiments, remaining 4 bits except for the MSB, the second MSB, the third MSB, and the 4th MSB among the 8 bits may be ignored.

According to various embodiments, a scheduled PDSCH may be received based on the DCI.

According to various embodiments, based on identifying that the positioning system information is modified based on the at least one bit, the PDSCH may include: (i) UE identity information and (ii) information related to at least one modified positioning system information type among a plurality of predefined positioning system information types.

According to various embodiments, based on the UE identity information matching an identifier assigned to the UE, the information related to the at least one modified positioning system information type may be obtained.

According to various embodiments, the at least one processor included in the network node (or at least one processor of the communication device included in the network node) may be configured to obtain DCI with a CRC scrambled with an RNTI related to paging.

According to various embodiments, the at least one processor included in the network node may be configured to transmit the DCI.

According to various embodiments, the DCI may include a message including a plurality of bits.

According to various embodiments, an MSB of the plurality of bits may be related to an indication of a modification in system information other than positioning system information.

According to various embodiments, at least one bit except for the MSB among the plurality of bits may be related to an indication of a modification of the positioning system information.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied Various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
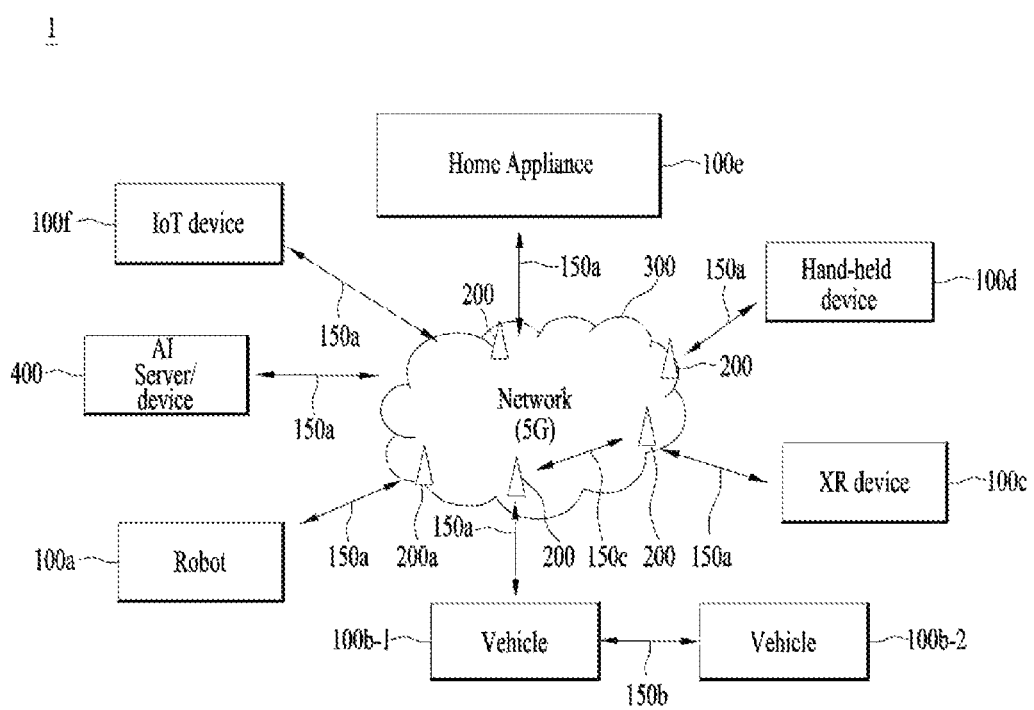
FIG. 21 illustrates an exemplary communication system to which various embodiments of the present disclosure are applied.

FIG. 21 illustrates an exemplary communication system to which various embodiments of the present disclosure are applied.

Referring to FIG. 21, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 22:
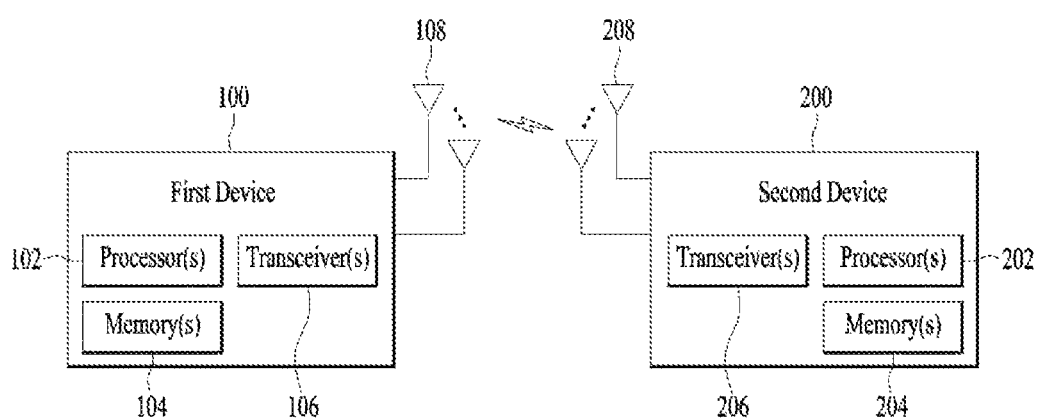
FIG. 22 illustrates exemplary wireless devices to which various embodiments of the present disclosure are applicable.

4.2.1 Example of Wireless Devices to which Various Embodiments of the Present Disclosure are Applied FIG. 22 illustrates exemplary wireless devices to which various embodiments of the present disclosure are applicable.

Referring to FIG. 22, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 23:
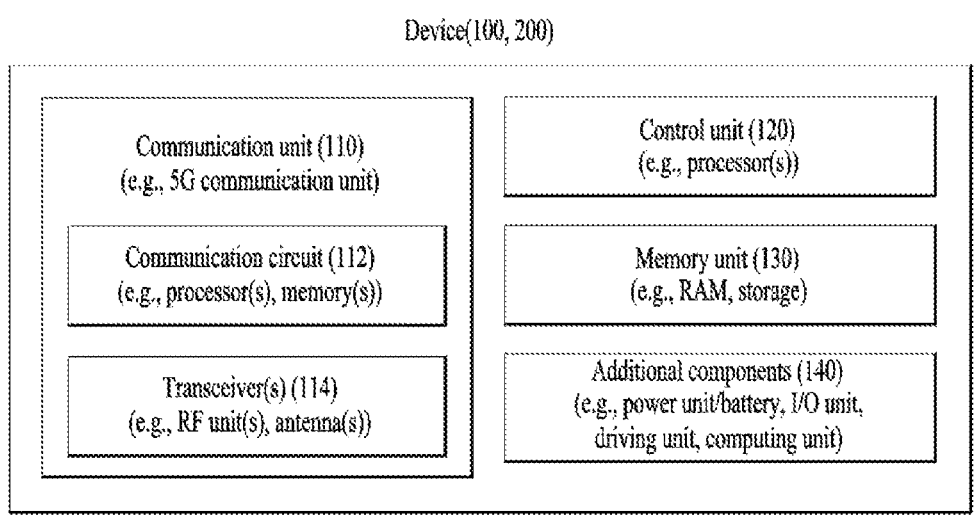
FIG. 23 illustrates other exemplary wireless devices to which various embodiments of the present disclosure are applied.

4.2.2. Example of Using Wireless Devices to which Various Embodiments of the Present Disclosure are Applied FIG. 23 illustrates other exemplary wireless devices to which various embodiments of the present disclosure are applied. The wireless devices may be implemented in various forms according to a use case/service.

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
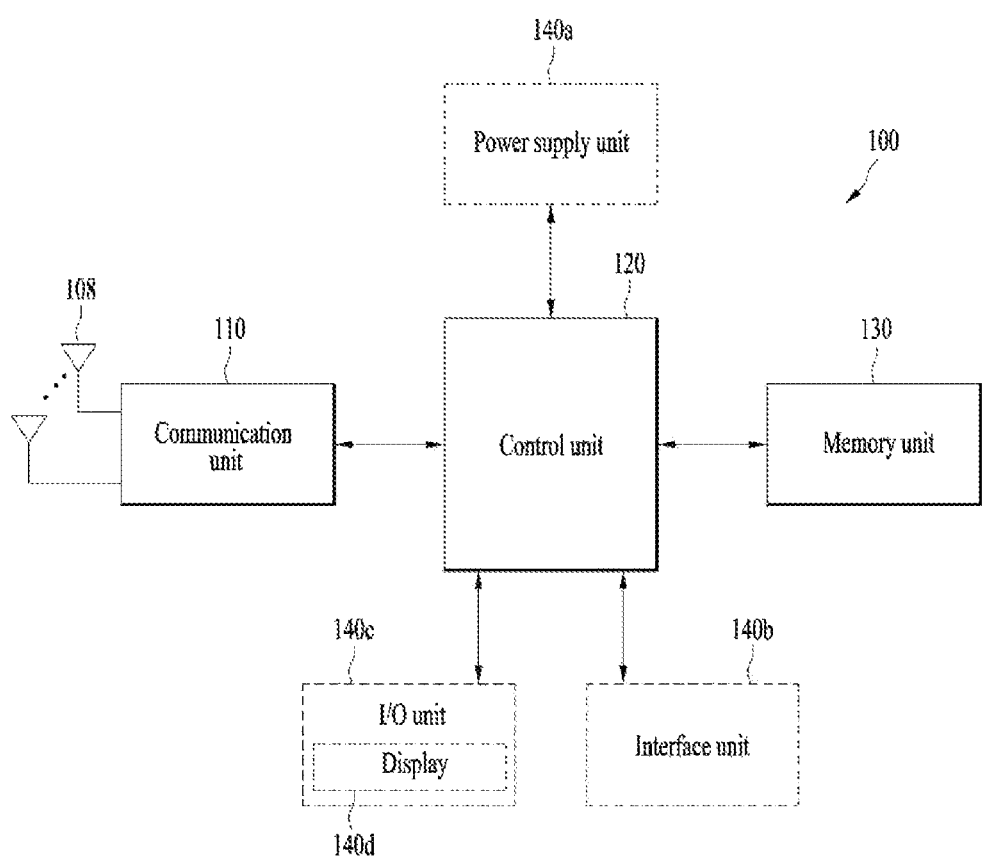
FIG. 24 illustrates an exemplary portable device to which various embodiments of the present disclosure are applied.

4.2.3. Example of Portable Device to which Various Embodiments of the Present Disclosure are Applied FIG. 24 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 25:
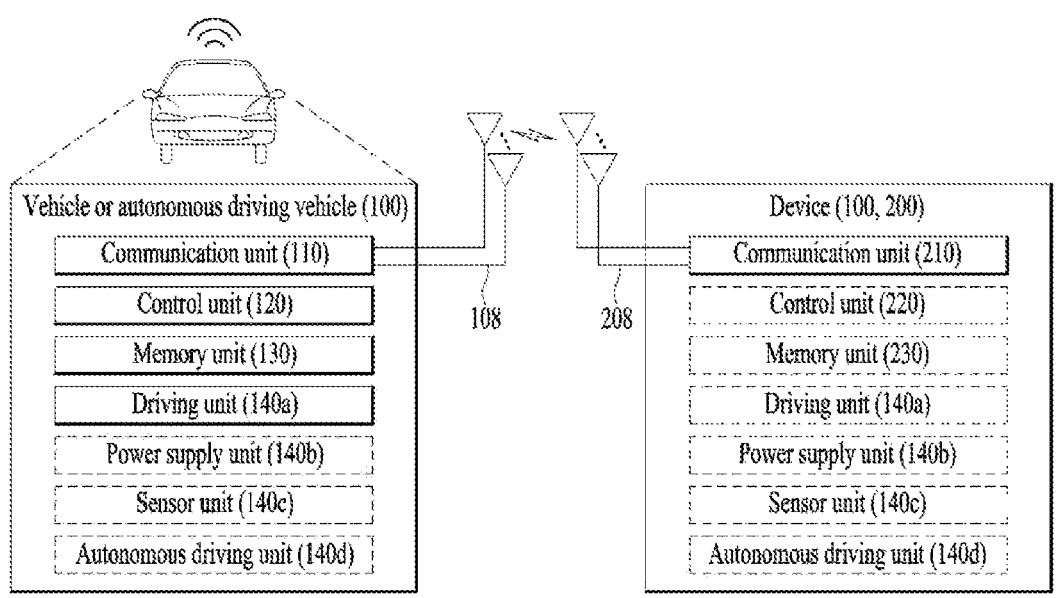
FIG. 25 illustrates an exemplary vehicle or autonomous driving vehicle to which various embodiments of the present disclosure.

FIG. 25 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
    receiving downlink control information (DCI) with a cyclic redundancy check (CRC) scrambled with a radio network temporary identifier (RNTI) related to paging; and
    obtaining a message comprising a plurality of bits based on the DCI,
    wherein a most significant bit (MSB) of the plurality of bits is related to an indication of a modification in system information other than positioning system information, and
    wherein at least one bit except for the MSB among the plurality of bits is related to an indication of a modification of the positioning system information.

2. The method of claim 1, wherein the at least one bit with a first value is mapped to an indication that the positioning system information is modified, and
    wherein the at least one bit with a second value is mapped to an indication that the positioning system information is not modified.

3. The method of claim 1, wherein the plurality of bits are 8 bits, and
    wherein the at least one bit is a 4th MSB of the 8 bits.

4. The method of claim 3, wherein a second MSB of the 8 bits is related to an indication of at least one of an earthquake and tsunami warning system (ETWS) or a commercial mobile alert system (CMAS),
    wherein a third MSB of the 8 bits is related to an indication of termination of monitoring of a physical downlink control channel (PDCCH) for the paging, and
    wherein remaining 4 bits except for the MSB, the second MSB, the third MSB, and the 4th MSB among the 8 bits are ignored.

5. The method of claim 1, wherein a scheduled physical downlink shared channel (PDSCH) is received based on the DCI,
    wherein based on identifying that the positioning system information is modified based on the at least one bit, the PDSCH comprises:
    (i) UE identity information; and
    (ii) information related to at least one modified positioning system information type among a plurality of predefined positioning system information types, and
    wherein based on the UE identity information matching an identifier assigned to the UE, the information related to the at least one modified positioning system information type is obtained.

6. A user equipment (UE) configured to operate in a wireless communication system, the UE comprising:
    a transceiver; and
    at least one processor coupled with the transceiver,
    wherein the at least one processor is configured to:
    receive downlink control information (DCI) with a cyclic redundancy check (CRC) scrambled with a radio network temporary identifier (RNTI) related to paging; and
    obtain a message comprising a plurality of bits based on the DCI,
    wherein a most significant bit (MSB) of the plurality of bits is related to an indication of a modification in system information other than positioning system information, and
    wherein at least one bit except for the MSB among the plurality of bits is related to an indication of a modification of the positioning system information.

7. The UE of claim 6, wherein the at least one bit with a first value is mapped to an indication that the positioning system information is modified, and
    wherein the at least one bit with a second value is mapped to an indication that the positioning system information is not modified.

8. The UE of claim 6, wherein the plurality of bits are 8 bits, and wherein the at least one bit is a 4th MSB of the 8 bits.

9. The UE of claim 8, wherein a second MSB of the 8 bits is related to an indication of at least one of an earthquake and tsunami warning system (ETWS) or a commercial mobile alert system (CMAS), wherein a third MSB of the 8 bits is related to an indication of termination of monitoring of a physical downlink control channel (PDCCH) for the paging, and wherein remaining 4 bits except for the MSB, the second MSB, the third MSB, and the 4th MSB among the 8 bits are ignored.

10. The UE of claim 6, wherein a scheduled physical downlink shared channel (PDSCH) is received based on the DCI, wherein based on identifying that the positioning system information is modified based on the at least one bit, the PDSCH comprises:

(i) UE identity information; and (ii) information related to at least one modified positioning system information type among a plurality of predefined positioning system information types, and wherein based on the UE identity information matching an identifier assigned to the UE, the information related to the at least one modified positioning system information type is obtained.

11. The UE of claim 6, wherein the at least one processor is configured to communicate with at least one of a mobile UE, a network, or an autonomous vehicle other than a vehicle including the UE.

12. A base station configured to operate in a wireless communication system, the base station comprising:

a transceiver; and at least one processor coupled with the transceiver, wherein the at least one processor is configured to:

obtain downlink control information (DCI) with a cyclic redundancy check (CRC) scrambled with a radio network temporary identifier (RNTI) related to paging; and transmit the DCI, wherein the DCI comprises a message comprising a plurality of bits, wherein a most significant bit (MSB) of the plurality of bits is related to an indication of a modification in system information other than positioning system information, and wherein at least one bit except for the MSB among the plurality of bits is related to an indication of a modification of the positioning system information.

* * * * *